United States Patent [19]

Stansfield et al.

[11] Patent Number: 5,228,820
[45] Date of Patent: Jul. 20, 1993

[54] ARTICLE HANDLING SYSTEM WITH DISTRIBUTED STORAGE

[75] Inventors: Thomas J. Stansfield, Mt. Airy; Anthony J. Barbera, Columbia; Dwight R. Koogle, Middletown; M. L. Fitzgerald, Columbia, all of Md.

[73] Assignee: Advanced Technology and Research Corporation, Laurel, Md.

[21] Appl. No.: 863,459

[22] Filed: Apr. 3, 1992

Related U.S. Application Data

[63] Continuation of Ser. No. 586,090, Sep. 21, 1990, abandoned.

[51] Int. Cl.⁵ .............................................. B65G 1/06
[52] U.S. Cl. ..................................... 414/278; 414/331; 414/274
[58] Field of Search ............... 414/266, 273, 274, 278, 414/285, 277, 281, 331, 286, 282, 593, 267, 279, 280, 283; 364/478

[56] References Cited

U.S. PATENT DOCUMENTS

| | | | |
|---|---|---|---|
| 2,718,972 | 9/1955 | Temple | 414/331 X |
| 3,670,867 | 6/1972 | Traube | 414/331 X |
| 3,734,229 | 5/1973 | Comer | 180/98 |
| 3,796,327 | 3/1974 | Meyer et al. | 214/38 |
| 4,059,194 | 11/1977 | Barry | 414/278 |
| 4,195,347 | 3/1980 | MacMunn et al. | 364/478 |
| 4,244,672 | 1/1981 | Lund | 414/134 |
| 4,284,160 | 8/1981 | DeLiban et al. | 180/168 |
| 4,415,975 | 11/1983 | Burt | 364/444 |
| 4,450,400 | 3/1984 | Gwyn | 414/278 X |
| 4,492,504 | 1/1985 | Hainsworth | 414/278 X |
| 4,630,216 | 12/1986 | Tyler et al. | 364/478 |
| 4,641,753 | 2/1987 | Tamada | 209/546 |
| 4,678,390 | 7/1987 | Bonneton et al. | 414/331 X |
| 4,719,694 | 1/1988 | Herberich et al. | 414/273 X |
| 4,764,078 | 8/1988 | Neri | 414/273 |
| 4,800,999 | 1/1989 | Matsuo | 414/277 X |
| 4,812,102 | 3/1989 | Smith et al. | 414/280 |
| 4,832,204 | 5/1989 | Handy et al. | 209/3.3 |
| 4,882,999 | 11/1989 | Azukizawa et al. | 104/281 |
| 4,901,471 | 2/1990 | Van den Top | 414/268 X |
| 4,917,227 | 4/1990 | Matsuo et al. | 414/268 X |
| 4,926,753 | 5/1990 | Weiss | 104/88 |
| 4,930,086 | 5/1990 | Fukasawa | 364/468 |
| 4,932,828 | 6/1990 | Katae et al. | 414/286 |
| 4,958,716 | 9/1990 | Matsuo et al. | 414/331 X |

Primary Examiner—Frank E. Werner
Assistant Examiner—James T. Eller, Jr.
Attorney, Agent, or Firm—Venable, Baetjer, Howard and Civiletti

[57] ABSTRACT

An article handling system comprises closed loop pathways, movable carriers adapted to travel along the pathways, a plurality of article storage buffer stations located adjacent to the pathways, and a hierarchical control system for controlling the transfer of articles to or from a given one of the article storage buffer stations by a movable carrier. The buffer stations provide distributed article storage which allows the system to operate with enhanced speed and efficiency.

16 Claims, 18 Drawing Sheets

AC MOTORS

LINEAR DRIVE ASSEMBLY
DC LINEAR DRIVE MOTOR
LINEAR STROKE POTENTIOMETER

ARTICLE HANDLING SYSTEM WITH DISTRIBUTED STORAGE

This application is a continuation of application Ser. No. 586,090, filed on Sep. 21, 1990, now abandoned.

BACKGROUND OF THE INVENTION

Automated handling system have been developed for use in mail handling, manufacturing, warehouse operations, and other applications. Generally, these systems have been adapted for transporting articles between various fixed locations such as between workstations, physical storage locations, and article loading and unloading stations. Accordingly, many of these systems are provided with a fixed pathway that is disposed between the stations for guiding the motion of one or more automatic article carriers. These systems are therefore disadvantageous when modifications need to be made to the processing plant in which they are implemented. Adding to or rerouting the pathway to accommodate the installation of new equipment and the rearrangement or removal of existing equipment is difficult because such adaptation generally requires significant changes in the control system for carrier operation along the pathway.

Some article handling systems comprise a central storage facility for articles being transported within the handling system. The storage facility generally comprises a grid of individual compartments which are each identifiable by a unique address and provided with sensors for detecting the presence of an article stored therein. A processor controls the operation of at least one vehicle to store and retrieve articles to and from selected compartments using shelf address and sensor data. Centralized storage, however, is disadvantageous in most article handling applications because the distance between workstations and the central storage area is long, thereby contributing to longer article carrier transit times and reduced system throughput.

Various systems have been proposed for controlling article carrier motion in article handling systems. For example, a first system provides carriers, which are confined to travel along a rail, with control signals that are transmitted along conductors within the rails. This type of carrier control system is disadvantageous because a failure in the rail conductors can result in the termination of control signal transmission and, therefore, the complete failure of the control system. A second system provides carriers with transceivers for receiving control signals from a transmitter located along the carrier path. This type of carrier control system is restricted to those areas of operation that are within the communication range of the transmitter. With either type of carrier control system, expansion of the article handling system is difficult because the addition of rails or carriers can require extensive modification of the existing control system and sometimes costly redesign and coordination with new control system components.

SUMMARY OF THE INVENTION

In accordance with one embodiment of the present invention, the foregoing limitations and disadvantages of the prior art are substantially avoided in an article handling system which comprises first and second closed loop pathways and an interloop transfer device for transferring an article from a first movable article carrier traveling along the first pathway to a second movable article carrier traveling along the second pathway. The article handling system further comprises at least one article storage buffer station positioned adjacent to a pathway which is provided with a plurality of shelves for storing articles thereon. The buffer station is also provided with an elevator and a buffer station controller which controls the operation of the elevator means to store articles on and to retrieve articles from the shelves.

In accordance with the present invention, a hierarchical control system is provided which comprises first and second system controller coupled to the first and second pathways, respectively. The first and second system controller are adapted to control the operation of the movable article carriers and the buffer stations associated with the first and second pathways, respectively. The operation of the first and second system controllers and an interloop transfer controller, which is coupled to the interloop transfer device, are generally controlled by a supervisory processor. The first and second system controller, the interloop transfer controller, and the supervisory processor are coupled to a common memory device, which generally comprises data relating to the location of articles in the buffer stations and to the position of movable article carriers along a pathway. The article location data comprises addresses for each buffer station shelf and an article identification code for each article stored on the shelf. The carrier position data is generally obtained from carrier status signals, which are generated by a carrier controller provided on-board each movable article carrier, in response to carrier control signals. Carrier control signals are generated and transmitted to the movable article carriers by first and second loop control means coupled to corresponding system control means. The carrier status signals and the carrier control signals are transmitted by first and second transceiver means coupled, respectively, to the movable article carrier and the loop control means.

A method for transporting articles to desired article storage locations along the first or second pathway is provided, whereby the supervisory processor processes data stored in a memory device to determine which of several system controllers is to receive a first command signal. The selected system controller is operated to generate appropriate hardware command signals to control a corresponding loop controller and at least one buffer station controller to execute the article transport operation specified in the first command signal. The loop controller and the buffer station controller are subsequently operated to control, respectively, a movable article carrier, and the shelves and elevator means, to complete the transport operation. The loop controller and the buffer station controller generate status signals which are stored in the memory device and subsequently used by the supervisory processor to determine the progress of execution of the first command signal and the operational status of the system hardware comprising the carrier and the buffer station.

An article handling system constructed and operated in accordance with the present invention can be characterized by several advantages over previous article handling systems. The closed loop pathway configuration with hierarchical control and common memory means allows for the operation of a modular and redundant system which can be installed with ease for use with various arrangements of articles handling equipment. The radio frequency communication link between the movable article carriers and their associated loop control means cooperate with the hierarchical control system and the common memory means to substantially continuously monitor carrier and article position along a pathway. Further, the placement of several movable article carriers and buffer stations along a pathway and the substantially continuous monitoring capabilities of the system avoid the need for centralized storage of articles, thereby decreasing carrier transit time and increasing system throughput.

BRIEF DESCRIPTION OF THE DRAWINGS

The various objects, advantages and novel features of the invention will be more readily understood from the following detailed description when read in conjunction with the appended drawings, in which.

Figure 1:
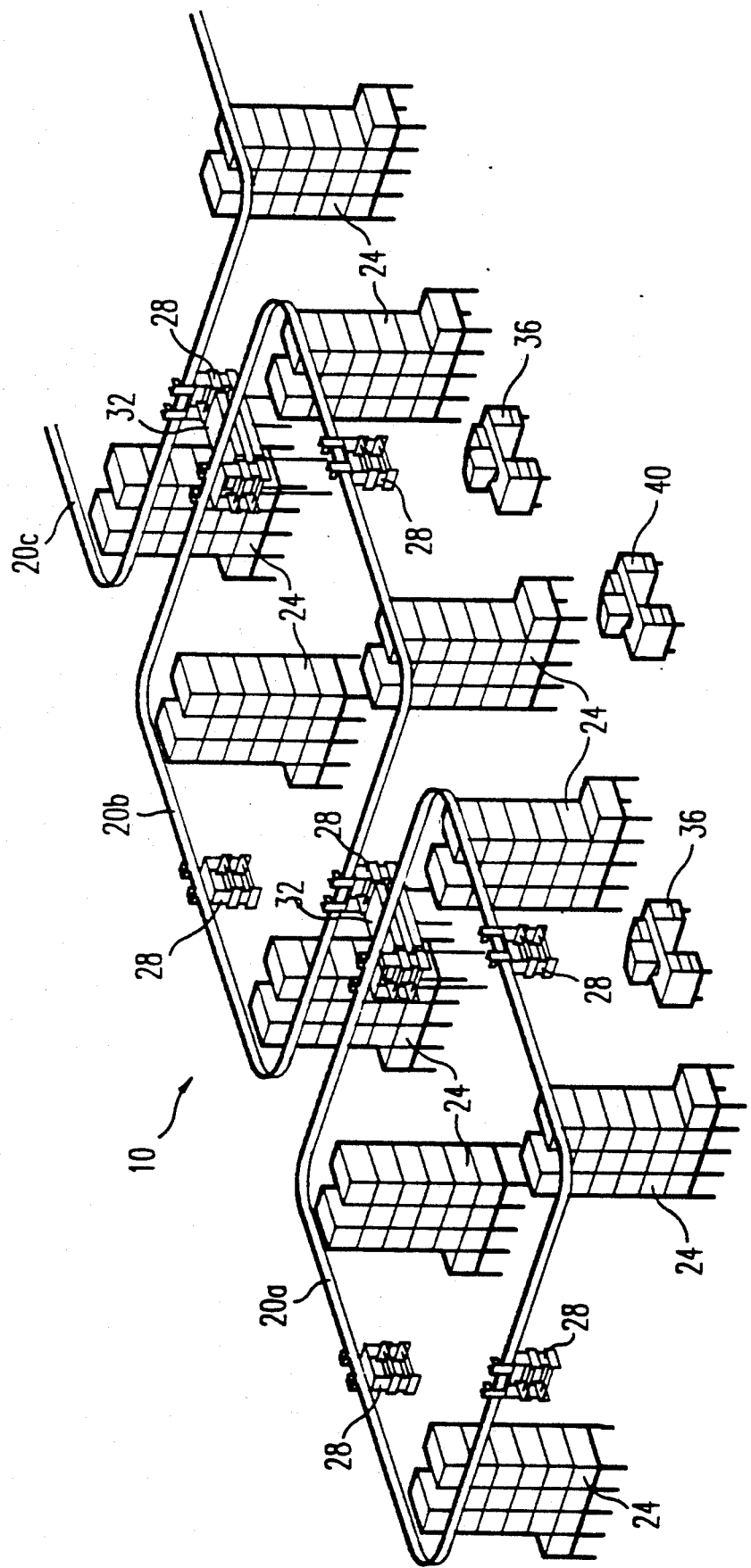
FIG. 1 is a schematic illustration of an automated article handling system constructed in accordance with the present invention.

DETAILED DESCRIPTION OF THE PREFERRED EMBODIMENTS:

FIG. 1 illustrates a preferred embodiment of an automated article handling system 10 with distributed storage constructed in accordance with the present invention. The article handling system 10 comprises a plurality of monorail pathways formed as continuous loops 20a, 20b and 20c wherein each loop 20 is provided with one or more buffer stations 24. Each loop is further provided with one or more movable carriers 28 that are configured to carry articles and to travel along the confined path of a particular continuous loop. The carriers 28 are operable to transfer articles to adjacent loops 20 by way of interloop transfer devices 32. As will be described in further detail below, system controllers 36 are provided at each of the loops 20 to coordinate the movement of the carriers 28 along the corresponding loops and the operation of the carriers with respect to the buffer stations 24 disposed along the loops. A supervisory computer 40 coordinates the operations of the system controllers 36.

The above-referenced components of the article handling system 10 shall be described in accordance with the following general outline:

I. Description of Hardware Components
  A. Buffer Station
    1. Shelves
    2. Elevator
  B. Carrier
  C. Monorail Loop
    1. Loop controller
    2. Interloop Transfer Apparatus
    3. Flexible Switch
  D. Supervisory Computer
II. Description of Software Control
  A. Hierarchical Control Structure
  B. Operation of Hardware Components

I. Description of Hardware Components

A. Buffer Station

Figure 2:
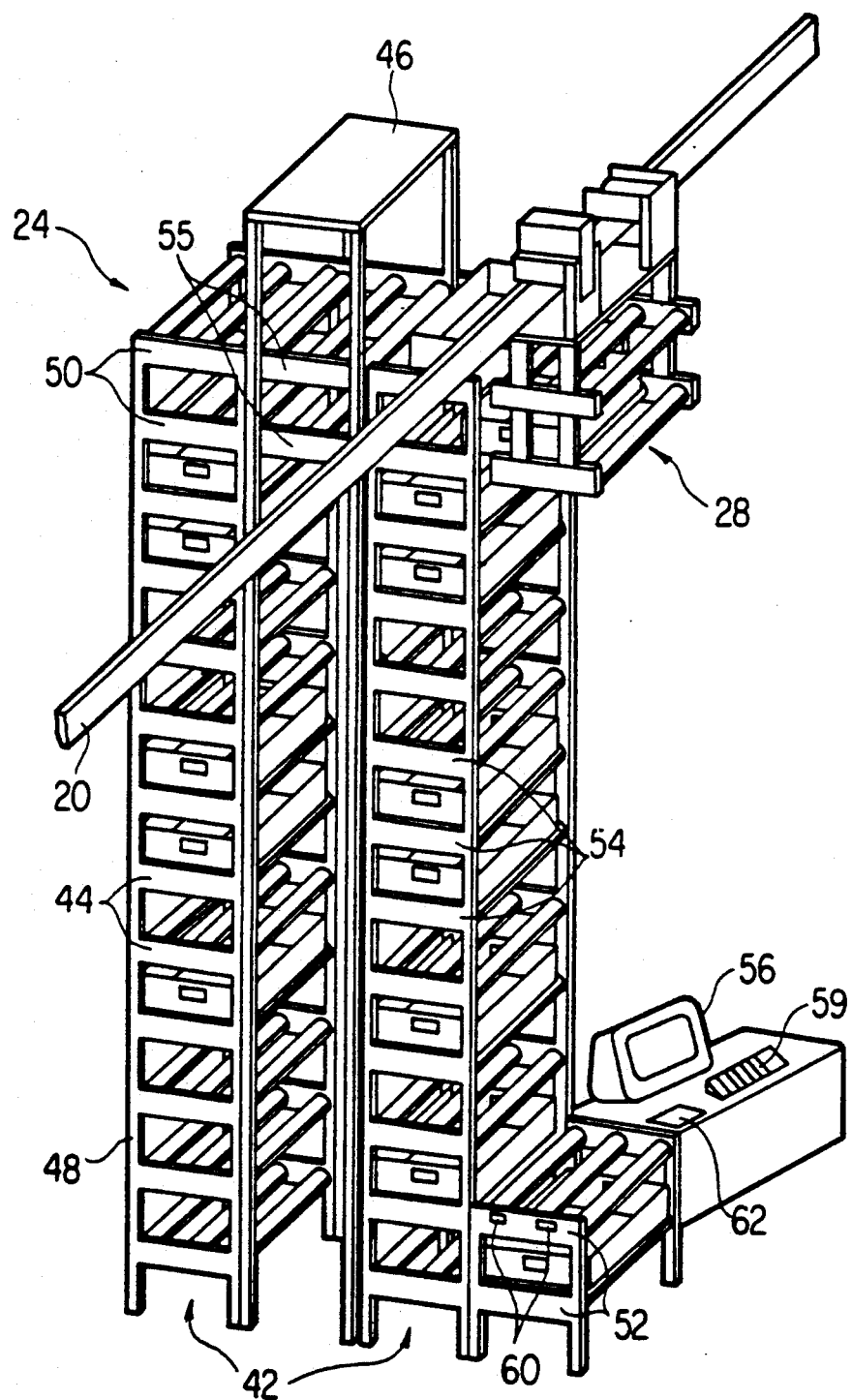
FIG. 2 is an elevational view of a buffer station constructed in accordance with the present invention.

Referring now to FIG. 2, a single buffer station 24 is depicted adjacent a portion of a monorail loop 20. The buffer station 24 comprises two sets of vertically arranged shelves 42 which are disposed respectively on opposite sides of an elevator 46. The shelves 44 and the elevator 46 are mounted to vertical frame members 48. The arrangement of individual shelves 44 and elevator 46 between vertical frame members 48 provides for a modular assembly which can be reconfigured with relative ease to accommodate, for example, additional shelves.

The uppermost shelves are designated as interface shelves 50 because, as shown in FIG. 2, these shelves are disposed at a sufficient height above ground to allow for their alignment with the shelves of a carrier 28 and the transfer of articles therebetween. An operator shelf 52 can be provided adjacent to at least one of the lowest vertical shelves to provide for the introduction of an article into the article handling system by a human operator. The remaining shelves 54 between the upper and lower shelves shall be referred to as buffer shelves.

Figure 3:
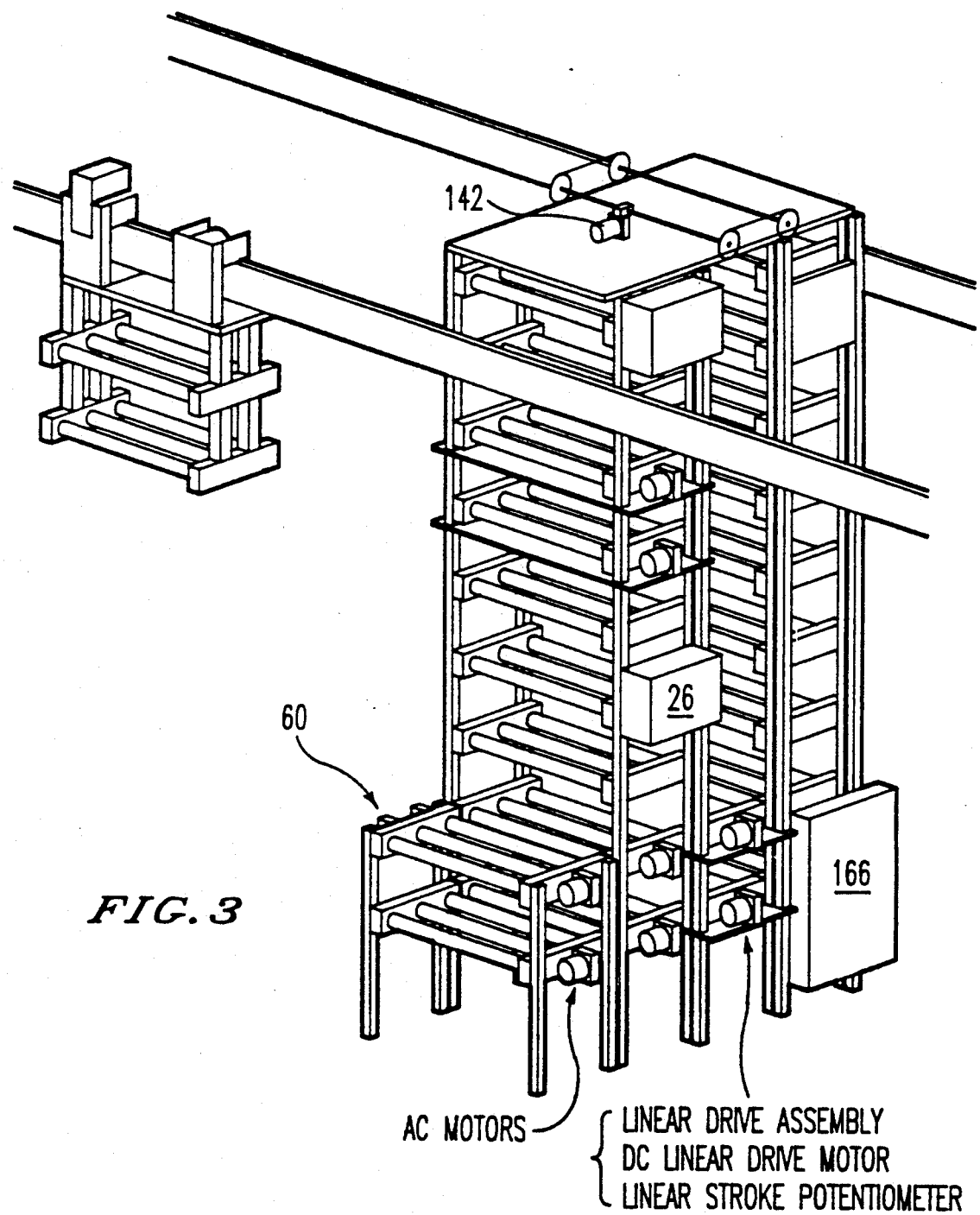
FIG. 3 is another elevational view of the buffer station depicted in FIG. 2.
Figure 4:
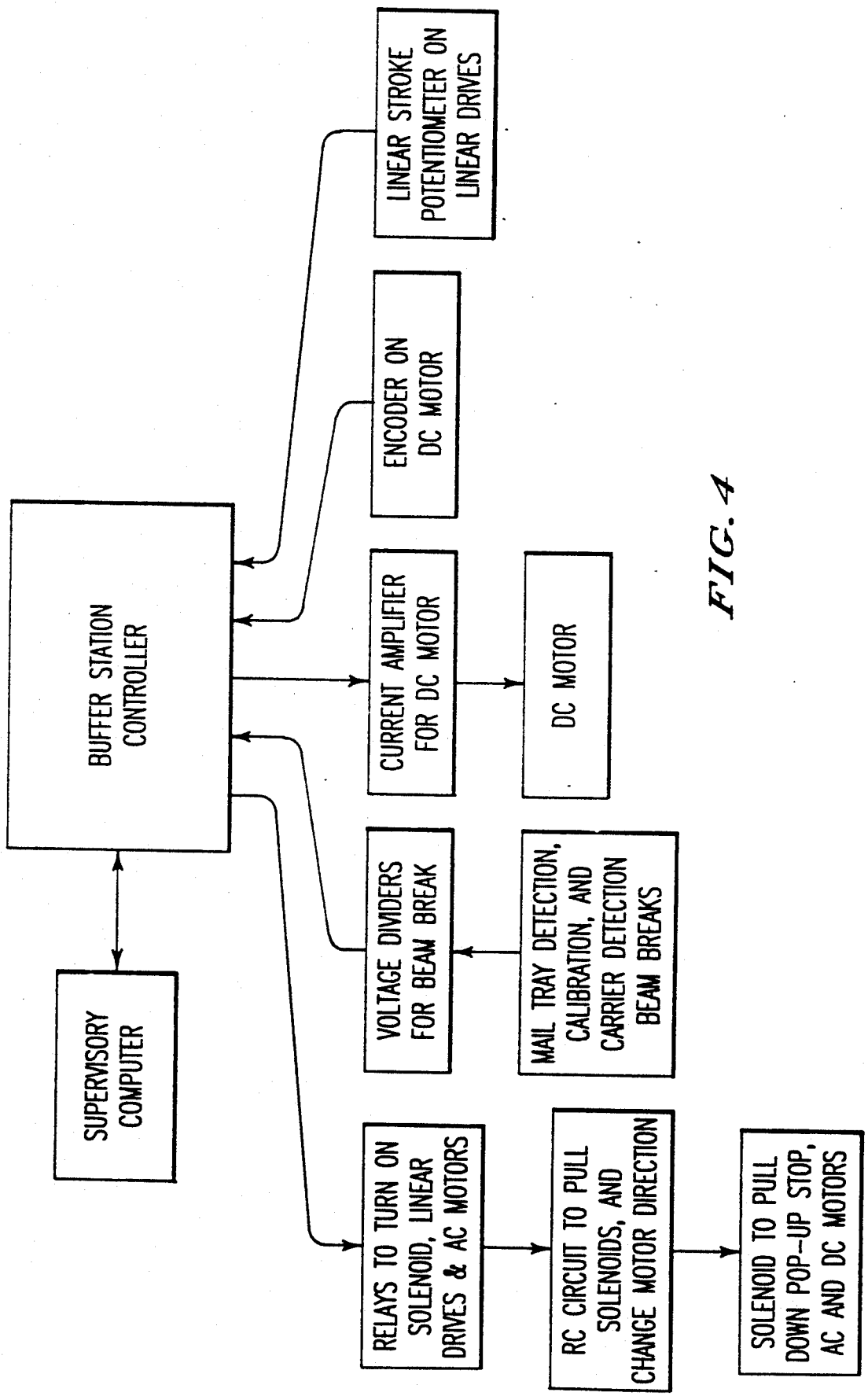
FIG. 4 is a block diagram of the buffer station controller.

FIGS. 3 and 4 illustrate the electronic components associated with a buffer station 24.

The buffer station is provided with a buffer station controller 26 (FIG. 3) which is preferably an IBM personal computer comprising a 96-channel digital I/O board, an 8-channel analog-to-digital converter with timer, an 8-channel RS-232 serial board, and an LM 629 motor controller board. The buffer station controller 26 communicates with the supervisory computer via a standard RS-232 communication channel. Electric cable junction boxes 27 are secured to the vertical frame members 48 for supplying A.C. power to the electrical components (e.g., shelves, elevator and controller) of the buffer station.

With reference to FIG. 2, the operator shelf 52 is shown coupled to an operator console 56. The console 56 is preferably an IBM Model AT personal computer which comprises an input sensor board for receiving output signals from beam break sensors 60 (FIG. 3). The beam break sensors 60 are disposed on the operator shelf 52 for detecting the presence of an article thereon. Beam break sensors are also provided on other buffer station shelves (e.g., the interface shelves) to detect the presence of carriers at the buffer station. The beam break sensors are coupled to voltage dividers that transmit output signals to the buffer station controller 26. The operator shelf further comprises means 62 for detecting a tray identification number (FIG. 2). For example, the operator shelf can be provided with a bar code reader or a radio frequency transceiver for detecting an identification that has been secured to the article in the form of a label or a radio frequency tag.

Figure 5:
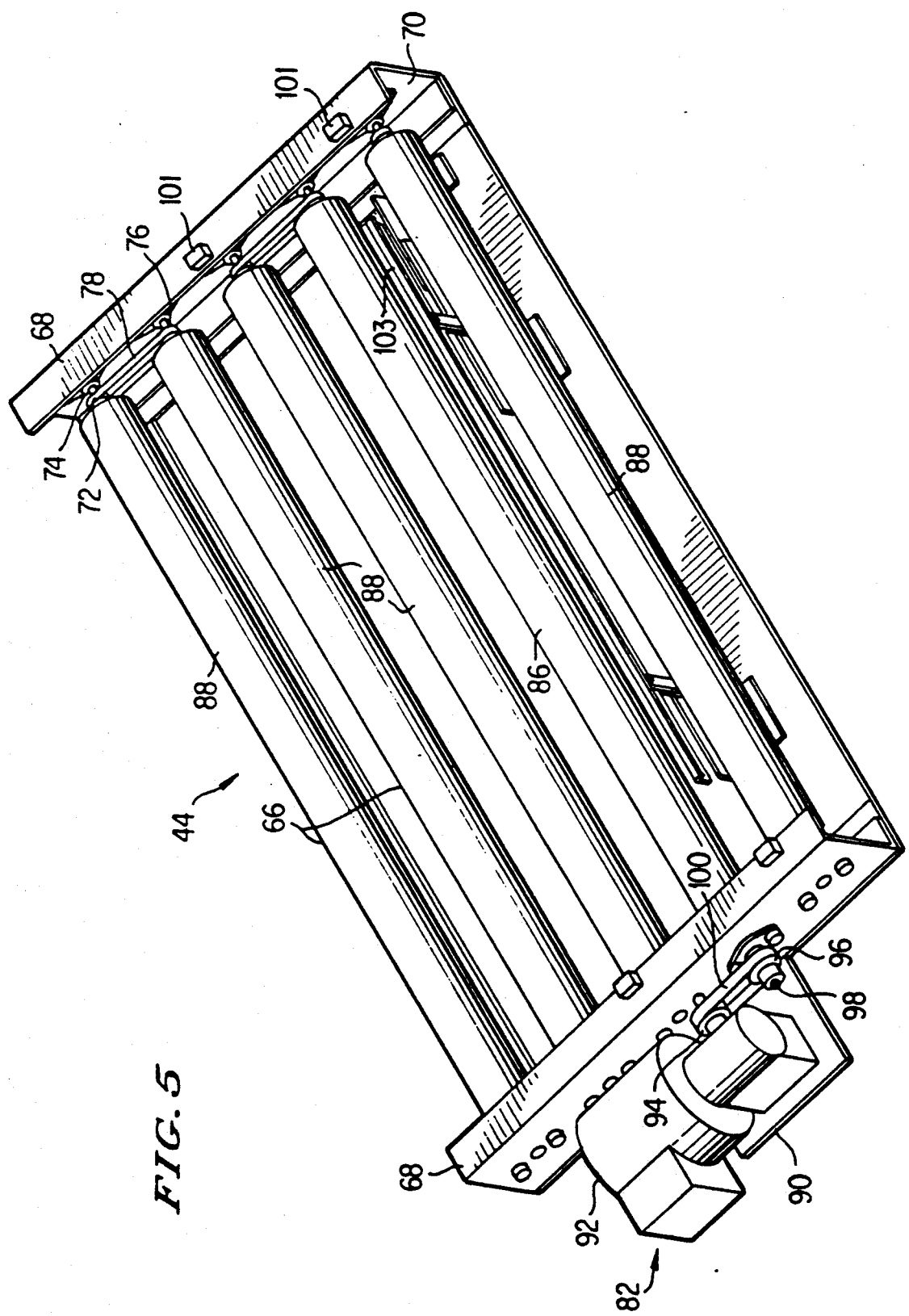
FIG. 5 is a perspective view of a buffer station shelf.

FIG. 5 is a perspective view of a shelf that is representative of the type of shelf that is employed as an operator shelf. As will be described in further detail below, the operator shelves are provided with means (e.g., an A.C. motor coupled to a roller) for automatically initiating the transfer of an article from the shelf to another surface.

Figure 6:
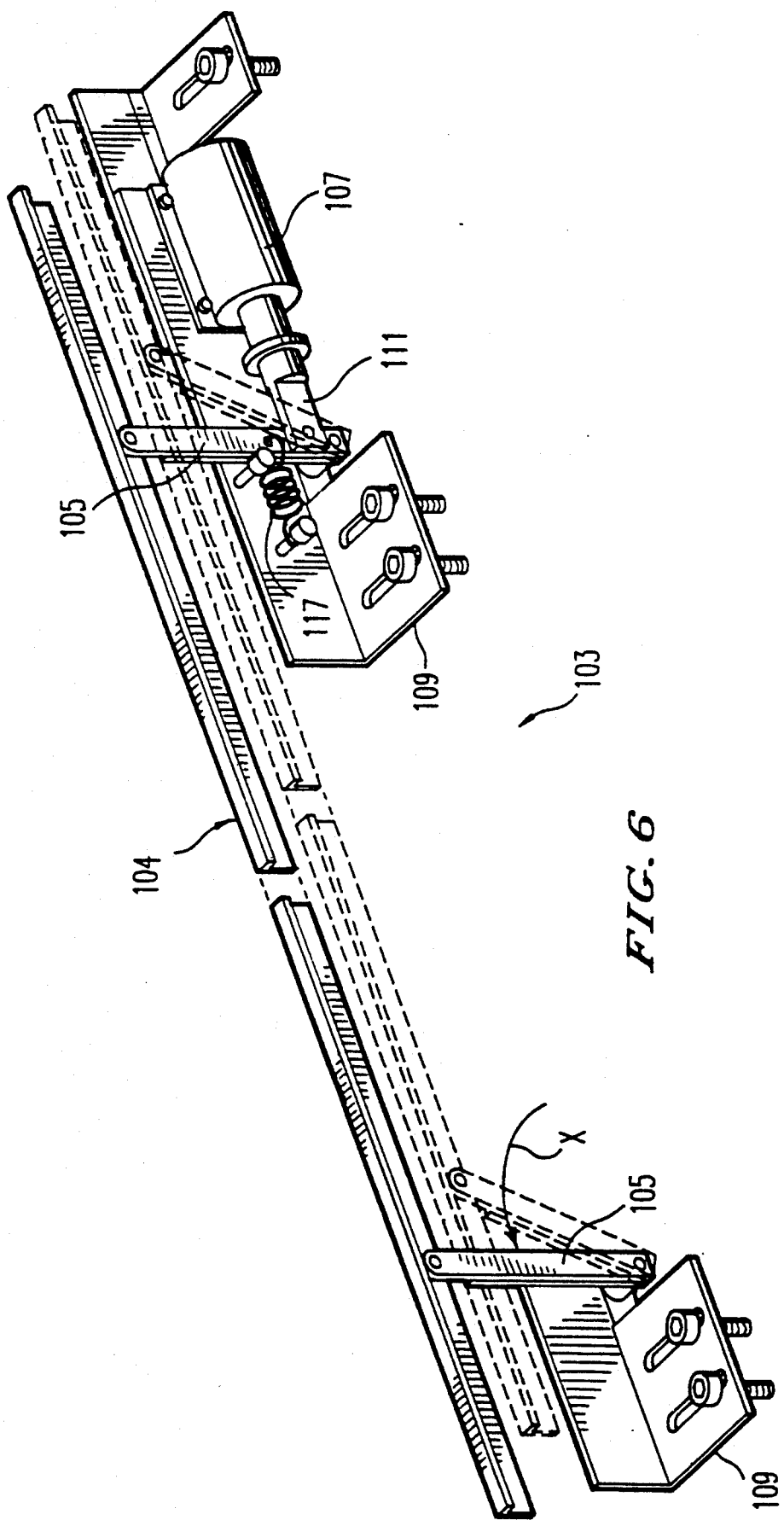
FIG. 6 is a perspective view of a positive stop gate.
Figure 7:
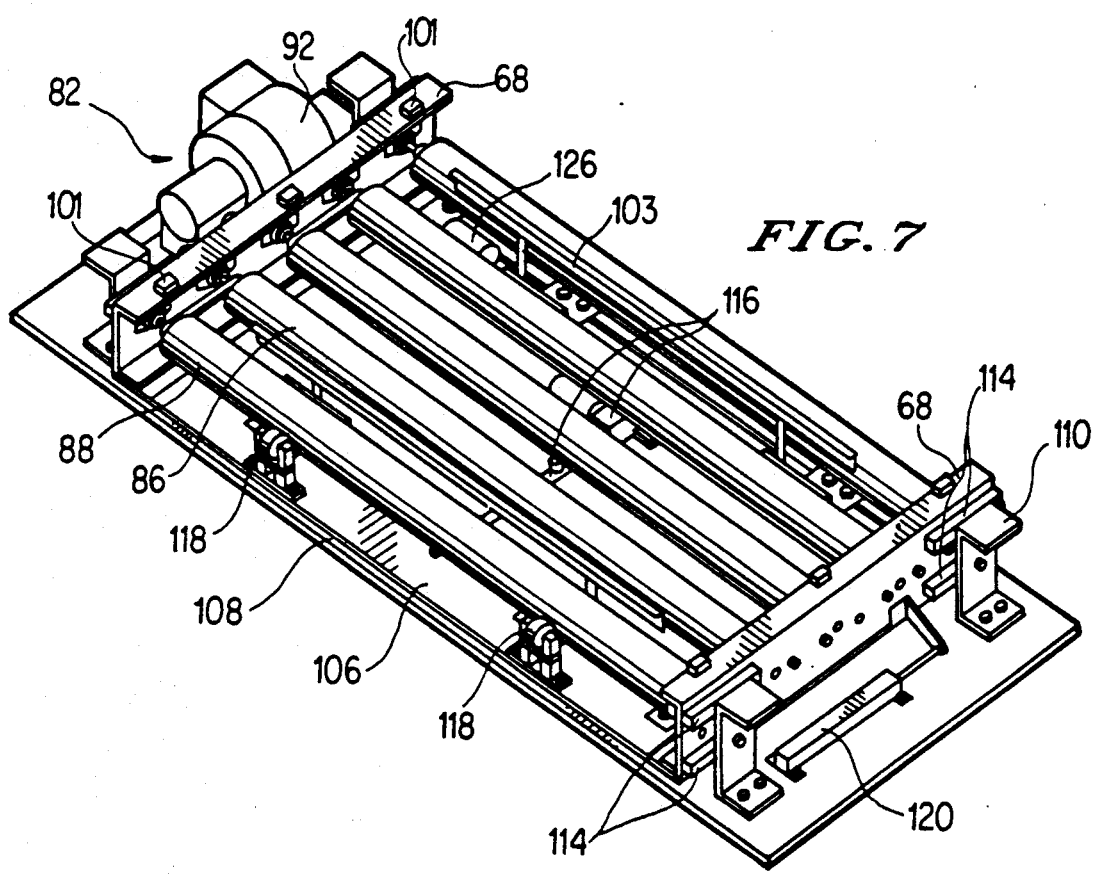
FIG. 7 is a perspective view of a buffer station shelf.

FIGS. 6 and 7 are perspective views of a shelf that is more complex than the shelf depicted in FIG. 5. This shelf is representative of the type of shelf that is employed as an interface shelf or in an elevator shelf in the buffer station. In addition to the D.C. motor and roller assembly depicted in FIG. 5, the shelf of FIG. 6 is provided with means for laterally moving a frame on which rollers are mounted toward another, adjacent shelf.

The shelf that is employed as a buffer shelf is relatively simple as compared to the elevator shelf or the interface or operator shelf and therefore is not depicted in a separate drawing. The buffer shelf generally is provided with the roller assemblies but not with motor assemblies.

1. Buffer Station Shelves

With reference to FIG. 5, the shelves 44 (e.g., buffer, interface, operator, and elevator shelves) are each provided with a plurality of rollers 66 disposed between two roller mounts 68. The roller mounts 68 are formed from a rigid material and are securable to the vertical frame members 48 in a conventional manner, e.g., by means of a nut and bolt assembly. The roller mounts each have a generally U-shaped cross-section that defines a channel 70. The ends of the rollers 66 are rotatably mounted to the roller mounts 68. Shafts 72 are provided on the ends of each of the rollers and are supported within bearings 74 that are secured within the channel 70. The ends of adjacent rollers 66 are mounted generally equidistant with respect to each other within the channel 70.

With further reference to FIG. 5, a sprocket 76 is attached to each of the roller shafts 72. A chain 78 is secured around the sprockets of adjacent rollers such that the rotation of a first roller has the effect of setting into motion a second, adjacent roller, which in turn effects the rotation of a third roller that is disposed adjacent to the second roller, and so on. The foregoing arrangement of rollers significantly reduces the complexity of the buffer station assembly. As will be described in further detail below in connection with FIGS. 5, 7 and 8, the interface shelves 50 and the operator shelves 52, as well as shelves associated with the elevator 46, are each provided with an A.C. motor assembly 82 for driving at least one of the rollers disposed on the shelf in response to command signals from a buffer station controller 26. The motor driven roller 86 shall be referred to as an active roller because in operation the active roller initiates the rotation of an adjacent roller 88 which is passive. The passive roller that is adjacent to the active roller 86 in turn initiates the rotation of the remaining passive rollers 88 due to the provision of a chain about the sprockets of adjacent rollers. The provision of A.C. motor assemblies 82 and active rollers 86 on a relatively small number shelves as compared to the number of buffer shelves associated with the buffer station reduces the number of components that are required to move articles. Thus, the amount of control that is required of the buffer station controller to operate the components is reduced.

With further reference to FIG. 5, the A.C. motor assembly 82 comprises a plate 90 which is mounted to one of the roller mounts of the shelf. The plate 90 is formed from a rigid material for supporting an A.C. gear motor 92 thereon. The gear motor 92 is actuable to drive a pulley 94. An additional pulley 96 is provided on the end of the active roller shaft 98 which is extended in comparison to a passive roller shaft so as to be rotatably coupled to the gear motor pulley 94 by a timing belt 100. The motor 92 is actuated by command signals from the buffer station controller 26 (FIG. 3) to rotate the pulley 94 and therefore the pulley 96 on the active roller 86 in a direction corresponding to the desired movement of the article either on or off of the shelf. The buffer station controller is operable to generate the command signals in accordance with sensor output signals from photosensors 101 which are provided on the shelf to detect the presence of an article traversing the rollers of the shelf. The shelf is further provided with a positive stop gate 103 which can be raised or lowered in response to command signals from the buffer station controller during the transfer of an article to or from the shelf.

FIG. 6 illustrates a positive stop gate 103 which is used to prevent articles stored thereon from falling off of the shelf during the transport of the shelf, for example, along the elevator shaft and through the area between an interface shelf and the carrier. The positive stop gate comprises a bar 104 on which two pivot arms 105 are pivotably mounted by conventional means (e.g. a pin and retaining ring). The pivot arms can be rotated under the control of a solenoid 107 so as to displace the bar 104 between raised and lowered positions. The pivot arms 105 are secured to a shelf by a bracket assembly. The pivot arms 105 are preferably disposed between the outermost rollers on a shelf in order to provide a sufficiently large amount of space on the shelf to store various sizes of articles.

With further reference to FIG. 6 the solenoid 107 is coupled with a connecting link member 111. The connecting link member 111 in turn is pivotably attached to at least one of the pivot arms 105 by conventional means such as a pin and retaining ring. The pivot arm that is coupled to the solenoid 107 is further coupled to a return spring 117. The solenoid 107 is operable in response to command signals from the buffer station controller 26 to exert a force against the pivot arm coupled thereto so as to rotate the pivot arm about a pivotable connection to the bracket. The effect of rotating at least one of the pivot arms by a solenoid 105 is generally to lower the stop bar as indicated by the phantom lines.

The shelf illustrated in FIGS. 7 and 8 comprises the A.C. motor assembly 82 and the active roller 86 described in connection with FIG. 5. The shelf depicted in FIGS. 7 and 8, however, further comprises an additional D.C. motor for moving a shelf plate 106, which supports several rollers, with respect to a base plate 108. The base plate 108 is formed from a rigid material so as to support the shelf plate 106. The shelf plate is secured to the base plate by brackets 110 which have roller assemblies (not depicted) attached thereto. The roller assemblies are configured to be received in corresponding tracks 114 which are provided on respective sides of the roller mount 68. A D.C. motor 116 is provided on the base shelf 108 and is coupled to the shelf plate 106 so as to effect movement of the roller assemblies along the tracks. Thus, the shelf plate 106 can be moved laterally with respect to the base plate 108.

Figure 8:
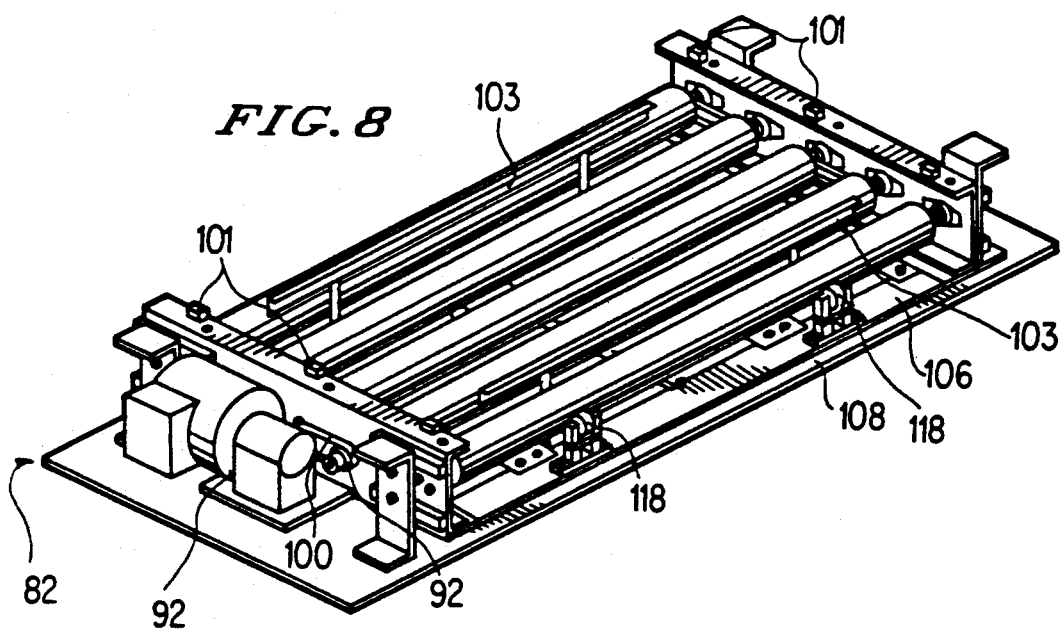
FIG. 8 is a perspective view of a buffer station shelf.

The shelf plate 106 depicted in FIGS. 7 and 8 is provided with traction rollers 118 which, when brought into contact with a passive roller of an adjacent passive shelf (not depicted) and caused to rotate, exert sufficient force against the passive roller to cause the passive roller to rotate. Each of the elevator shelves 55 and the interface shelves 50 are provided with laterally displaceable shelf plates 106 with traction rollers 118 for bringing the traction rollers 118 into contact with the passive rollers 88 of other shelves in order to effect the transfer of articles between the shelf and another shelf.

The amount of pressure that a laterally movable shelf plate 106 exerts through its traction wheels 118 is deduced from the rate of change of transfer detectable by a potentiometer 120 that is provided on the base plate 108. The shelf plate motor 116 is operable to transport the shelf plate 106 along the track 114 toward a target shelf until the buffer station controller receives feedback data from the potentiometer 120 which indicates that the rate of change of the reading from the potentiometer 120 has decreased below a predetermined value. In response to such feedback data, the buffer station controller transmits a command signal to the shelf plate motor 116 to stop the lateral movement of the shelf plate 106. The potentiometer therefore ensures contact between the traction wheels 118 and a target shelf regardless of variable gaps between the traction wheels 118 and the target shelf due to roller wear.

The roller mounts 68 of the shelf depicted in FIGS. 7 and 8 are each provided with three photosensors 101 as compared to the two photosensors provided on the roller mounts of the shelf depicted in FIG. 5. The roller mounts of the elevator shelves 55 are generally provided with three photosensors 101. Two of the photosensors 101, which are positioned generally on the sides of the roller mounts 68, are used primarily to detect whether an article is extending beyond the corresponding shelf or whether an article is completely on or off the shelf following an article transfer. The third photosensor, which is disposed between the two side photosensors, is used primarily to detect the presence or absence of an article on the shelf.

Positive stop gates similar to the stop gate described in connection with FIG. 6 are provided on the shelf depicted in FIGS. 7 and 8. The stop gates can be raised or lowered by a solenoid 126 which is mounted on the shelf plate 106. The solenoid 107 is actuated in response to command signals from the buffer station controller. For example, the buffer station controller effects the lowering of the stop gate prior to article transfers between the elevator shelf and other shelves. The stop gates are operable when raised to prevent articles from sliding off of the shelf. Thus, the elevator shelves are generally provided with a stop gate adjacent each of the outermost rollers because the elevator shelf is operable to transfer articles from both sides of the elevator shelf.

2. Buffer Station Elevator

Figure 16:
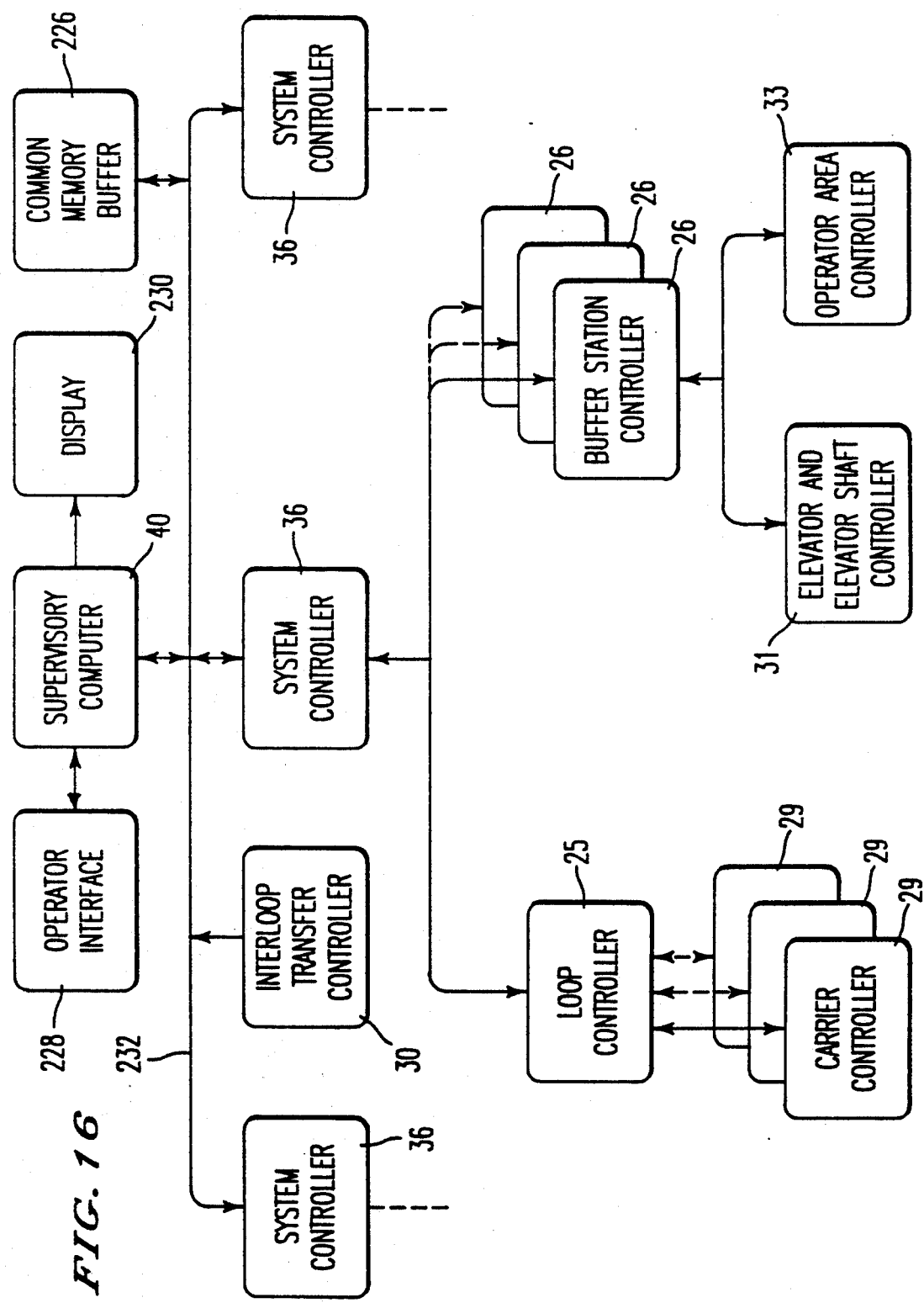
FIG. 16 is a schematic diagram of the hierarchical control system of the present invention.

The elevator 46 will now be described in connection with FIG. 9 which illustrates the elevator assembly supported by the vertical frame members 48 of the buffer station 24 depicted in FIG. 2. The shelves 44 of the buffer station are not shown in order to provide an improved view of the elevator 46. The elevator 46 provides for the movement of articles between the carriers 28, the interface shelves 50, the operator shelves 52, and the buffer shelves 54. The elevator comprises a lift tray 130 that can be vertically displaced between the two sets of shelves 42. The lift tray 130 comprises at least one elevator shelf 52 that is similar in construction to the shelf depicted in FIG. 5 in that the shelf is provided with an active roller 86 that is driven by a D.C. motor 92. The elevator further comprises a lift assembly 134, which is coupled to the lift tray 130 and a lift motor 133. The lift motor 133 is a D.C. motor which operates the lift assembly 134 to raise and lower the lift tray 130 along a vertical, elongated shaft. The buffer station controller comprises a processor board therein which is operable to actuate the lift motor 133 and the motors associated with the elevator shelves in response to command signals from the buffer station controller. The processor board (not depicted) shall be referred to as an elevator and elevator shelf controller. The elevator and elevator shelf controller 31 is described below in connection with the operation of the hardware components (FIG. 16).

The lift assembly 134 shall be described with reference to FIG. 9. The lift motor 133 is operable to rotate the input shaft of a gear reducer 142. A sprocket 144 is secured to the output shaft of the gear reducer 142. A chain 148 is coupled to the sprocket 144 and to another sprocket 150 which is journalled to receive a shaft 152 therein. The shaft 152 is rotatably mounted within a pillow block assembly 154, and is provided with a sprocket 156 on each end thereof. In operation, the lift motor effects the rotation of the sprocket 144 and therefore of the sprocket 150. The sprocket 150, in turn, rotates the shaft 152. The lift assembly further comprises a second shaft 153 which is rotatably mounted within a second pillow block assembly 155. The second shaft is provided with sprockets 151 in each end thereof. Chains 158 and 159 are suspended over the sprockets 151 and 156 on the respective ends of the shafts 153 and 152. The chains 158 and 159 are each secured at one end to the lift assembly 130 by a bracket 160. The other ends of the chains 158 and 159 are affixed to a counterweight 166 by brackets 168. The counterweight 166 is of sufficient mass to balance the lift tray 130. Thus, when the lift motor 133 is actuated to rotate the gear reducer 142 and, therefore, the shaft 152, the shaft 153 also rotates. The sprockets on the ends of the rotating shafts effect the taking up of or release of the respective chains 158 and 159 so as to raise or lower the lift tray 130.

Figure 9:
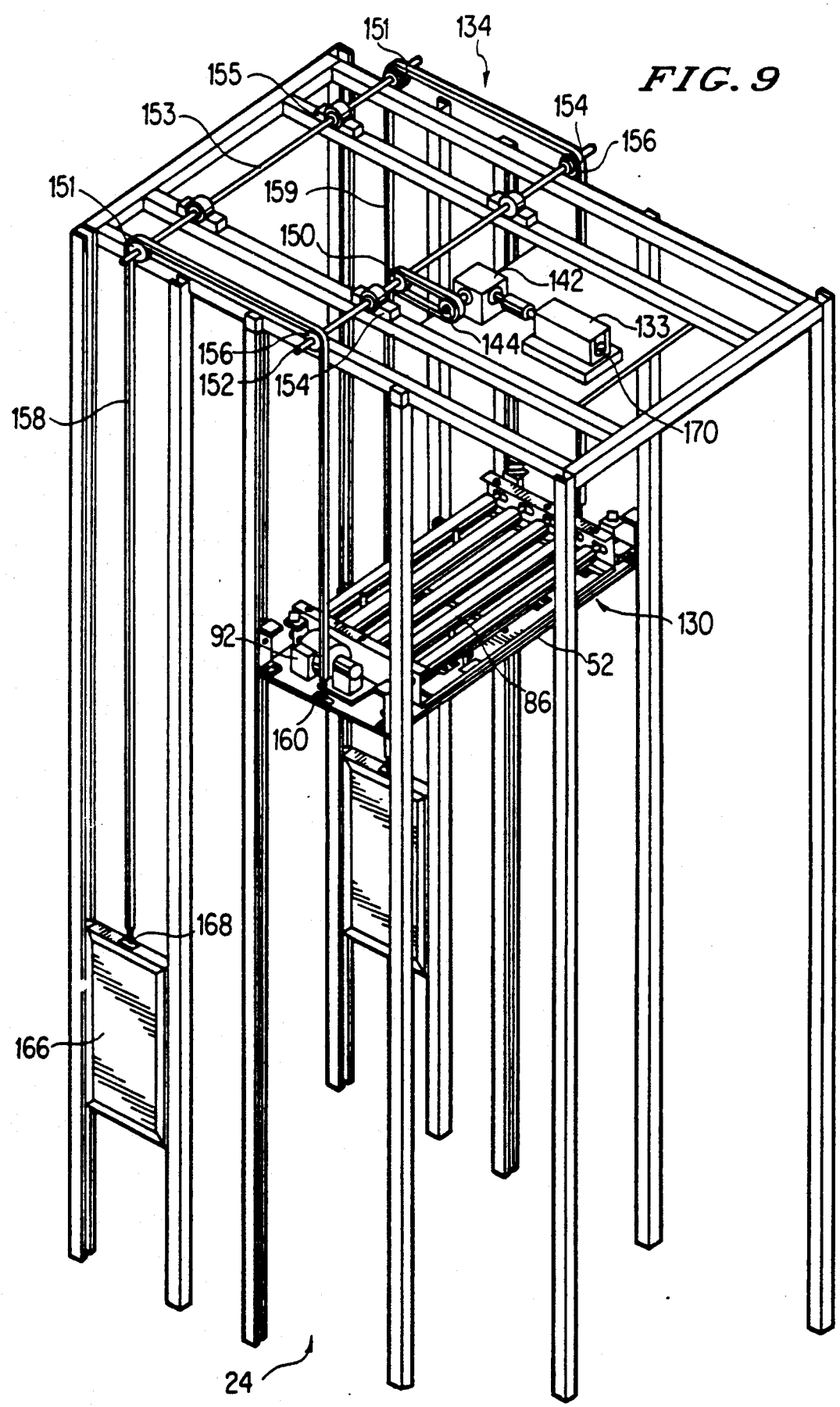
FIG. 9 is an elevational view of a buffer station elevator.

With further reference to FIG. 9, an encoder 170 is coupled to the lift motor 133 to generate count signals that correspond to the distance traveled by the lift tray 130. The encoder count signals are used by a processor and associated memory on the servo board 136 to continuously monitor the position of the lift tray 130. Thus, the lift tray can, under the control of the servo board, be raised and lowered so as to be aligned with a selected one of the shelves 44.

B. Carrier

Figure 10:
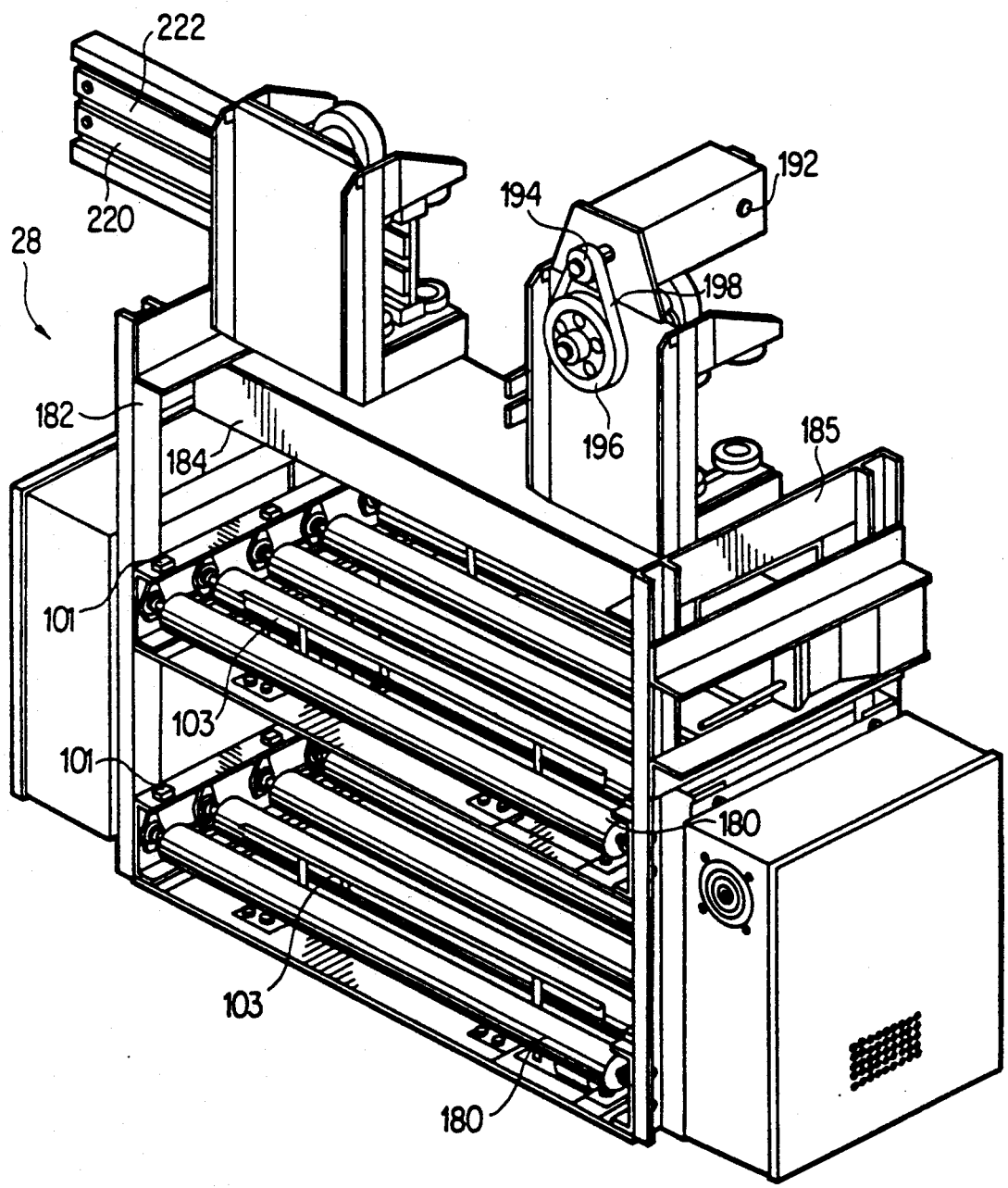
FIGS. 10-12 are perspective views of a carrier.
Figure 11:
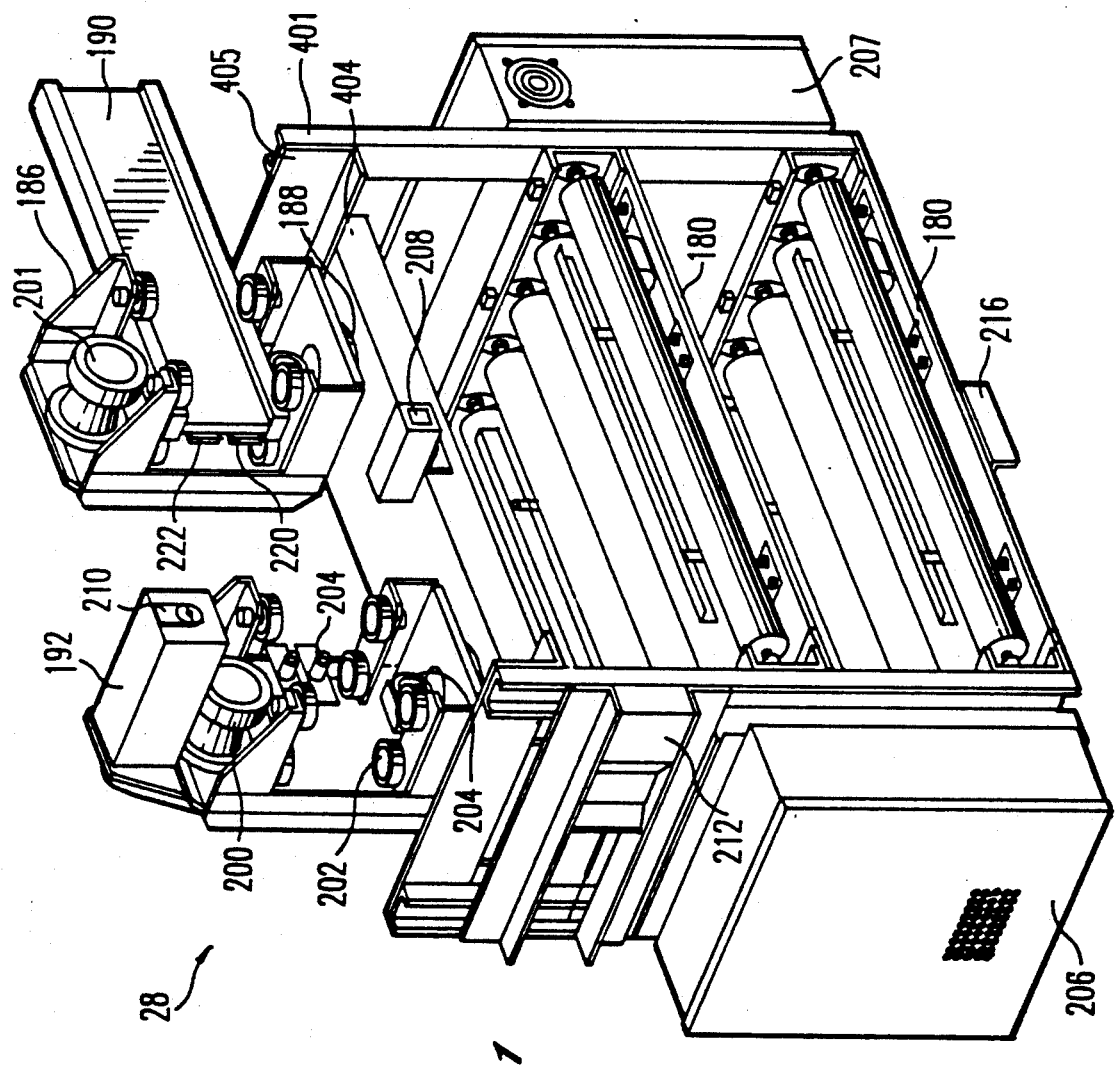

FIGS. 10 and 11 provide prospective views of a carrier 28 of the present invention. As shown in FIG. 10, the carrier generally comprises passive shelves 180 which are secured in a conventional manner (e.g., by means of a nut and bolt assembly) to upright frame members 182. The upright frame members 182 are attached to a main chassis frame 184 using angle brackets 185. Each of the passive shelves 180 is constructed in a manner similar to the buffer shelf in that the passive shelves are not provided with an A.C. motor assembly 82 (FIG. 5) for automatically rotating one of the rollers. The passive shelves 180 of the carrier 28, however, are provided with an additional photosensor 101 and an additional positive stop gate 103. Thus, passive carrier shelves are configured with three photosensors 101 and two positive stop gates.

Each of the carriers is provided with trolley frames 186 which are attached to the chassis main frame 184 through swivel bearing assemblies 188, as shown in FIG. 11. The swivel bearing assemblies 188 allow the trolley frames 186 one axis of movement, e.g., rotation about the vertical axis through the center of the bearing assemblies. Thus, the swivel bearings allow the carrier to negotiate horizontal curves on the monorail pathway 190.

With further reference to FIG. 10, the carrier is driven by a brush type, 24-volt D.C. carrier motor 192 through a toothed belt system which comprises a driver sprocket 194 that is attached to the shaft of the carrier motor 192, a driven sprocket 196, and a belt 198 that is coupled to the driver sprocket 194 and the driven sprocket 196. With reference to FIG. 11, a traction wheel 200 is attached to the opposite end of a shaft that supports the driven sprocket 196. The traction wheel is preferably formed from urethane so as to provide traction against the monorail pathway 190, which is preferably formed from aluminum, and to reduce noise. The carrier motor 192 is operable to rotate sprocket 194 and therefore the traction wheel 200 in order to drive the carrier 28 linearly along the monorail pathway 190.

Lateral guide wheels 202 are secured to the trolley frames 186. The lateral guide wheels 202 are operable to guide the carrier along the monorail pathway 190. The lateral guide wheels are preferably formed of urethane which provides for the absorption of mechanical shock created by the carrier when negotiating horizontal curves, as well as to reduce noise. Retaining wheels 204 are positioned with respect to the monorail path 190 so as to provide a gap between the running surface of the traction wheels 200 and the monorail surface 190. Retaining wheels 204 are secured to the trolley frame 186 to positively secure the carrier to the monorail pathway in a vertical direction. The retaining wheels are preferably formed of urethane. A second traction wheel 201 is provided on an angle bracket that is disposed opposite the angle bracket supporting the carrier motor 192. The second traction wheel 201 is not driven by a motor but is instead allowed to rotate freely. The traction wheels 200 and 201 are positioned with respect to the chassis mainframe 184 so as to support the weight of the entire carrier 28.

Electrical power carried by the monorail is collected by spring-loaded collecting brushes 204 (FIG. 11). The electrical power collected by the brushes 204 is supplied to an onboard computer which is mounted inside an enclosure 206 that is secured to one side of the chassis mainframe 184 of the carrier. The on-board computer shall be referred to as the carrier processor. The carrier processor controls the linear motion of the carrier as well as the positive stop gates 103 of the passive shelves in accordance with command signals received from the corresponding loop controller 36 (FIG. 1). The carrier is provided with a plurality of sensors for providing feedback data relating to the velocity and the position of the carrier to the computer. A metal-presence activated switch 208 (e.g., a magnetic sensor) is attached to the side of the carrier. The switch is activated upon detection of metal targets that are strategically placed along the monorail pathway. For example, the metal targets are disposed at points along the monorail pathway that are in relatively close proximity with respect to a buffer station. The carrier is further provided with a rotary encoder 210, which is attached to an output shaft of the carrier motor 192, for providing feedback data relating to carrier velocity to the carrier processor. The system designer initially provides each carrier with data relating to the number of encoder counts that exist between designated targets, that is, between each of the buffer stations along a loop. The carrier processor uses output count signals from the rotary encoder 210 as well as output signals from the metal presence activated switch 208 to determine the placement of the carrier with respect to any one of the buffer stations along the loop. The computer transmits position and velocity data to a loop controller 25, which is described in further detail below in connection with FIG. 16, via a radio frequency spread spectrum transceiver 212. The RF spread spectrum transceiver is further operable to receive commands from the loop controller to effect the transfer of the carrier to a particular buffer station.

As the carrier delivers, receives and transfers trays from respective buffer stations, the carrier position with respect to a buffer station is verified using a beam reflector that is mounted to the main chassis frame 184 of the carrier. The beam reflector operates in connection with a reflective sensor mounted on each of the buffer stations in order to detect the presence of the carrier with respect to the buffer station prior to any exchanges of trays between the interface shelf of respective buffer stations and the carrier. The carrier is provided with a retaining shoe 216 which interlocks with a bracket that is mounted on the buffer station so as to hold the carrier in position with respect to the buffer station. The shoe 216 supports the carrier against lateral forces exerted by the contact of the friction drive wheels extending from the interface shelf of the buffer station.

Figure 12:
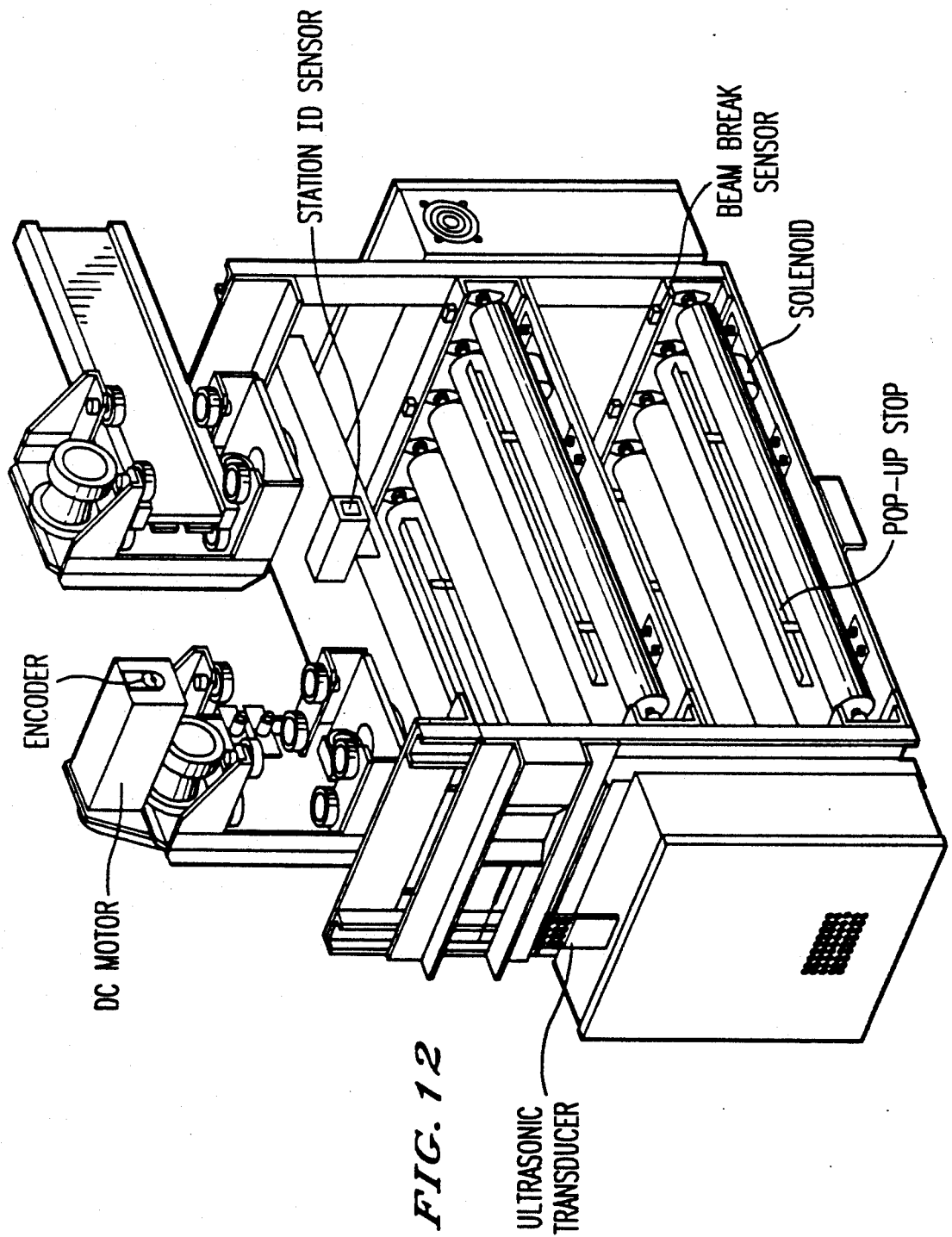
Figure 13:
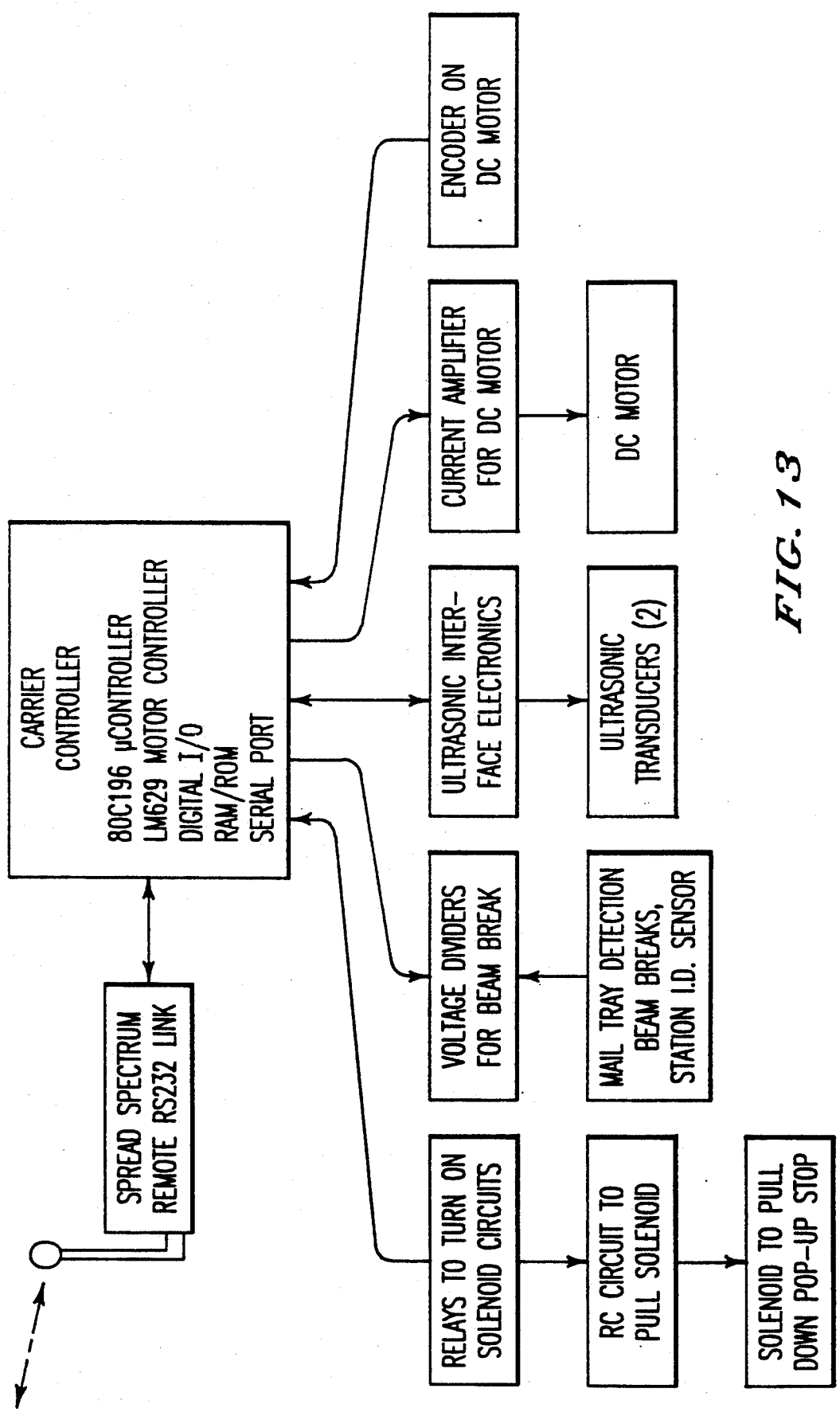
FIG. 13 is a block diagram of the carrier controller.

FIGS. 12 and 13 illustrate the electrical components associated with a carrier 28.

C. Monorail Loop

With reference to FIG. 11, a monorail section is depicted which comprises two buses. The material is formed from a rigid material such as aluminum and is preferably configured to be one inch wide and three inches in the vertical dimension. The buses correspond to a ground bus 220 and a power bus 222 which continuously carries 24 volts for supplying power to the motor 192 of each of the carriers 28. Unlike many monorail systems, which supply control data to carriers using additional data buses, the monorail of the present invention is relatively simple and requires reduced maintenance. In place of one or more control data buses, the present system employs instead radio frequency communications between the carriers and a loop controller. By eliminating the use of the monorail to transmit control signals, the monorail system of the present invention can be provided with additional monorail segments without requiring substantial modification to the control system, i.e., the loop controller and the supervisory computer.

1. Loop Controller

The loop controller 25 (FIG. 16) that is associated with each monorail pathway loop within the system is preferably an IBM-compatible personal computer with a 386 processor. The loop controller is provided with a transceiver (not depicted) for effecting radio frequency spread spectrum R232 communications between the loop controller and the respective standard transceivers 212 (FIG. 11) on board the carriers traveling along the monorail pathway associated with the loop controller. The loop controller is further provided with an interface for transmitting and receiving signals from the system controller 36.

2. Interloop Transfer Apparatus

Figure 14:
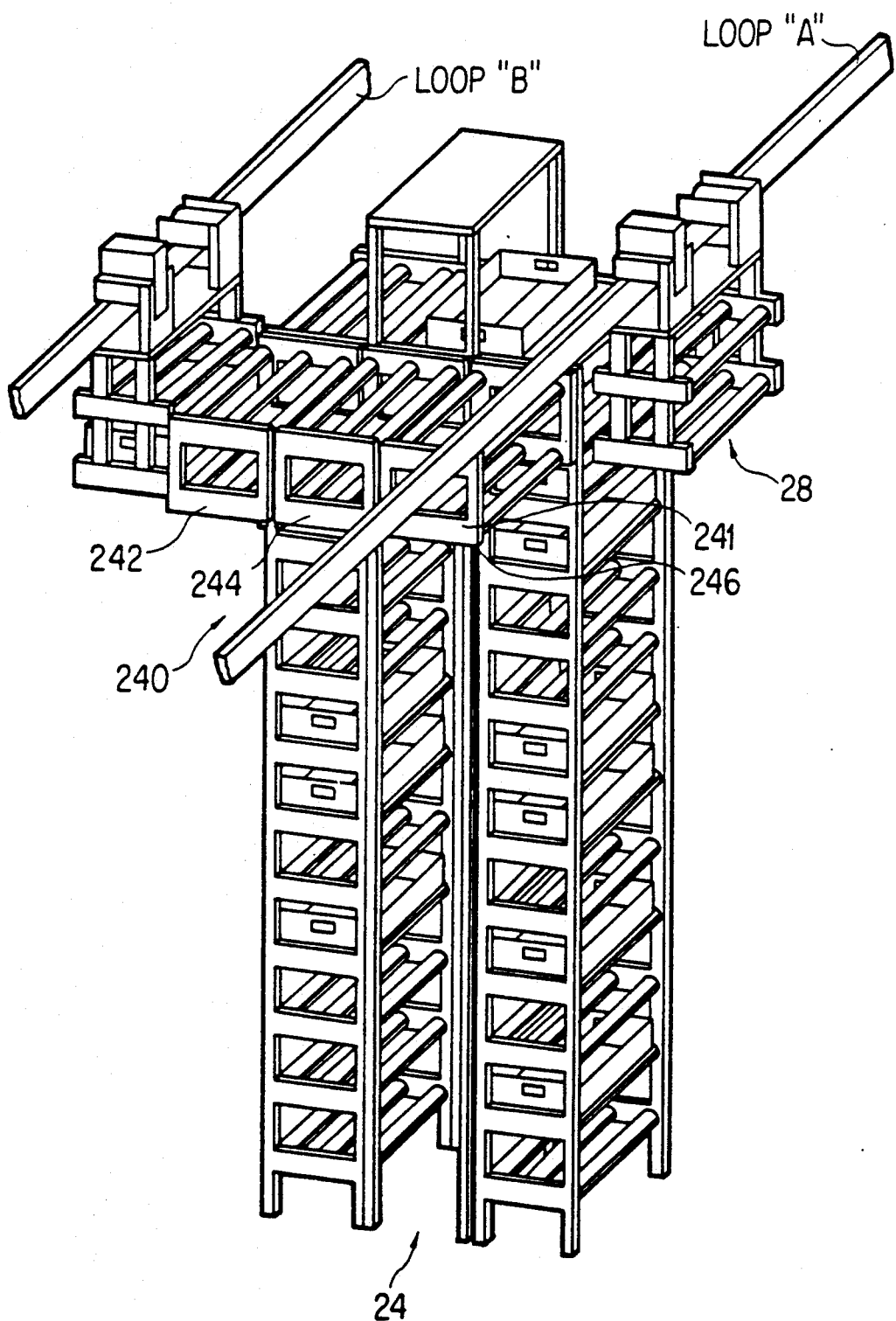
FIG. 14 is a side elevational view of an interloop transfer apparatus.

FIG. 14 illustrates an interloop transfer apparatus which is generally disposed adjacent a buffer station and which provides for the transfer of an article from the carrier of a first loop "A" to the carrier of a second loop "B". The interloop transfer apparatus is shown supported against the buffer station by a bracket 241. The inner loop transfer apparatus is disposed at a sufficient level above ground such that the shelves of the interface transfer apparatus are in alignment with respect to the shelves of carriers travelling along loop "A" and loop "B". The inner loop transfer apparatus generally comprises three adjacent shelves 242, 244 and 246. As shown in FIG. 14, the three adjacent shelves are arranged so as to provide a generally horizontal surface over which articles can be transported. The two outermost shelves 242 and 246 are operable as interface shelves to the carriers and operate in essentially the same manner as the interface shelves described above in connection with the buffer stations. The interface shelves receive commands from the interloop transfer controller 30 (FIG. 16), which is associated with loop "A" and loop "B", to effect the lateral displacement of a shelf plate on which several traction rollers are mounted toward a carrier shelf. The laterally displaceable interface shelf is described above in connection with FIG. 7.

With further reference to FIG. 14, the carrier associated with loop "B" is shown to be in alignment with the interface shelf 242. As described in connection with FIG. 7, the traction rollers associated with the interface shelf 242 are extended toward a passive roller in the carrier and pressed against the passive roller. The traction rollers exert sufficient force to provide for the rotation of the carrier passive roller upon rotation of the interface rollers. The middle shelf 244 is operable to initiate the transfer of an article from the shelf 242 to the other shelf 246. The operator shelf 244 is provided with a motor assembly for rotating an active roller in a manner which is described in further detail in connection with FIG. 3. The motor assembly is operable to rotate the rollers of the operator shelf in the desired direction so as to effect the transfer of an article both to and from either of the outer shelves 242 and 246.

3. Flexible Switch

Figure 15:
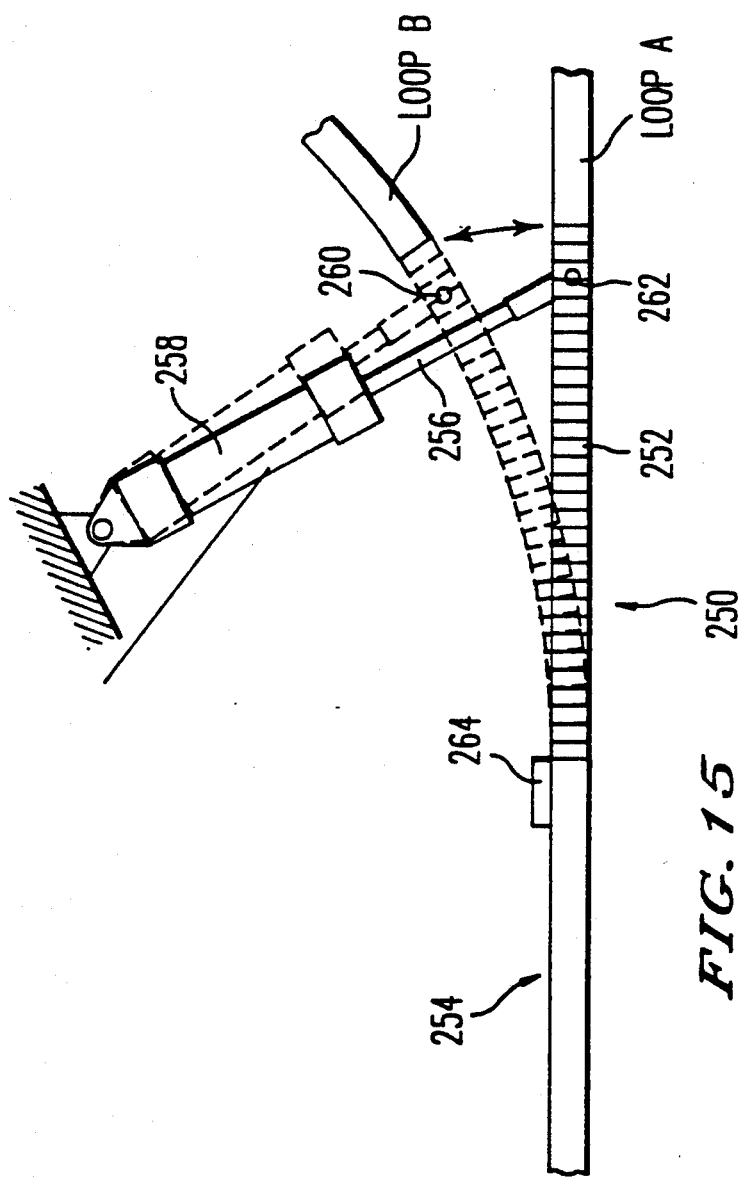
FIG. 15 illustrates the operation of a monorail switch.

FIG. 15 illustrates a switch 250 which is operable to transfer a section of monorail between the terminal points of two monorail loops. The monorail loops, for illustrative purposes, shall be referred to as outer loop A and inner loop B.

The switch comprises a flexible member 252 which is preferably formed from a polyurethane material so as to have the same cross-section as the fixed monorail sections. The polyurethane member 252 is secured to the terminal point of a fixed monorail section 254 by conventional means (e.g., a nut and bolt assembly). The opposite end of the polyurethane member is maintained in relatively close proximity with respect to the terminal section of loop A by a pneumatic rod 256. The pneumatic rod is preferably part of an air cylinder 258 is operable to be extended and retracted. The air cylinder is controlled by a set of manual toggle switches (not depicted) that direct electrical power to a solenoid. The solenoid controls the operation of a four-way air valve that directs air flow through the air cylinder.

The pneumatic rod illustrated in FIG. 15 is shown in an extended position such that the end of the polyurethane member attached thereto forms a generally continuous portion of the loop A. The manual toggle switches of the air cylinder can be operated such that the pneumatic rod retracts, thereby bringing the end of the polyurethane member attached thereto towards the terminal point of loop B so as to form a continuous section of loop B. The phantom lines in FIG. 15 illustrate the pneumatic rod in a retracted position and therefore the polyurethane member forms a section of loop B.

The end of the polyurethane member that is secured to the pneumatic rod is formed with a recess 260 for receiving the rod. The rod is secured within the recess by an alignment pin 262. The opposite end of the pneumatic rod is secured to a fixed surface such as part of the monorail frame by conventional means such as a nut and bolt assembly.

A metal plate 264 is provided on the end of the polyurethane member that is fixedly attached to the monorail section so as to provide a carrier travelling along the fixed monorail section and the switch with a smooth intersection. Further, the pneumatic rod maintains the polyurethane member in sufficient proximity with respect to either loop A or B so as to provide a continuous or a smooth intersection between the switch and the loop.

D. Supervisory Computer

With reference to FIG. 16, the supervisory computer 40 is preferably a personal computer (e.g., an IBM Model AT personal computer) which runs on a 20-millisecond clock cycle. The supervisory computer is provided with a common memory buffer 266 that is also addressable by each of the loop controllers, buffer station controllers and carrier processors through a common bus. The common memory buffer 226 is described in more detail below in connection with the hierarchical control structure of the system. The supervisory computer is further provided with a keyboard interface 228 for receiving commands from a human operator and a graphics display unit 230 for monitoring system response to operator commands, such as the completion of operated selected tasks by the buffer stations and carriers.

II. Description of Software Control

A. Hierarchical Control Structure

The operation of each of the carriers and the buffer stations within the article handling system is controlled using a hierarchical control structure that employs modular hardware and software processing components. The hardware components of the hierarchical control structure are depicted in FIG. 16. A supervisory computer 40 is provided to render a first level of processing control to separate system controllers 36. The system controllers 36 control and coordinate the buffer station controllers 26 and the loop controllers 25 to provide a second level of processing control. The loop controllers 25 control and coordinate the operation of the carrier controllers 29, and the buffer and station controllers 26 control and coordinate the interface shelf controller 30, the elevator and elevator shelf controller 31, and the operator shelf controller 33. The layer of control afforded by the controllers 30, 31 and 33, in turn, control the motors and actuators required to move such components as the rollers, the elevator lift tray, and the positive stop gate, and to read in sensor signals from, for example, photosensors and beam break sensors.

The implementation of the multi-level hierarchical control structure shown in FIG. 16 is advantageous over single computer processing, as each level of control can be executed independently on separate processors. The tasks to be performed by the system, which comprises a plurality of monorail loops along which several carriers and buffer stations are disposed, are initially defined by the system designer and decomposed into several simpler subtasks. The subtasks are subsequently assigned to particular control levels for execution. The functions for each control level processor are therefore well defined and distinguishable from those of the other control level processors of the system.

Figure 17:
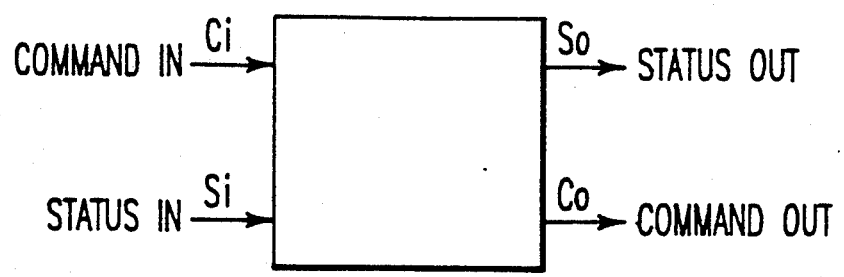
FIG. 17 illustrates the signal flow of a control system processor.

Each control level processor is designed to receive a small number of selected input signals and to generate a limited set of output signals in accordance with the subtasks that the processor is designed perform. The output signals comprise command and status data that is determined by input command signals and feedback signals relating to the state of control level processor. Thus, higher and lower control level processors are programmed to provide the processor with only those command signals and status data signals, respectively, that are relevant to the decision making function of the processor. The signal flow for a generic control level processor is illustrated in FIG. 17. The depicted control level processor is representative of the supervisory computer as well as each system controller, loop controller, carrier controller, buffer station controller, interface controller, elevator and elevator shelf controllers, and operator shelf controller. The control level processor (1) receives an input command signal $c_i$ from a higher level control device, (2) receives input status signals $s_i$ from a lower level control processor, (3) generates output command signals $c_o$ for the lower level control processor in accordance with the input status signal, and (4) generates an output status signal $s_o$ for a higher control level processor.

Figure 18:
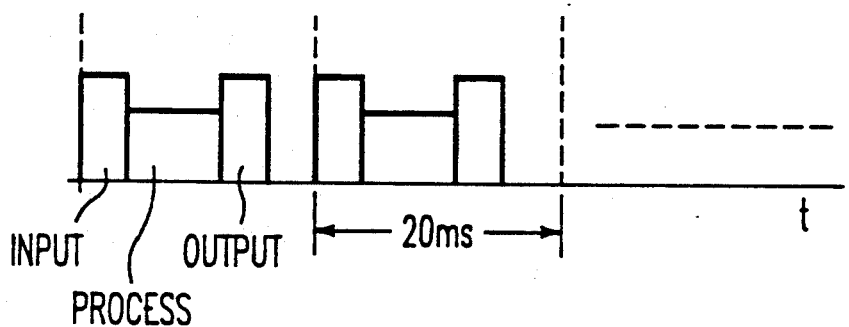
FIG. 18 illustrates the clock cycle of a control system processor.

Each control level processor is operable to read input command and status signals and to generate output command and status signals within a 20 ms cycle of the supervisory computer clock. As shown in FIG. 18, the operation essentially comprises the steps of reading in command and status information from higher and lower level processors, respectively, processing the command to decompose the command into subtasks for lower level processors, and writing out the commands for executing the subtasks.

In a system where several processors are used to sort and move articles throughout several locations, the coordination of data signal flow between processors can become very complicated, particularly when processors on different control levels are working simultaneously. The present invention simplifies data signal flow through the use of the common memory buffer 226.

The common memory buffer is coupled to each of the control level processors by a common bus 232 (FIG. 16). Selected common buffers within the common memory buffer are assigned to respective processes that have been defined for each of the control levels of the control system. For example, certain common buffers are reserved for the storage and retrieval of data by the buffer station controllers 26 and the supervisory computer 40, respectively, relating to the presence of an article on a buffer rack interface shelf that is ready for pick-up by a carrier. Each control level processor is programmed to read data from selected ones of the assigned common buffers during the input portion of the 20 ms cycle. The data can include input command signals from higher level processor or status data signals from lower level processors. After executing computations during the process cycle, the processor is programmed to write data to selected ones of the assigned buffers during the write portion of the 20 ms cycle. The data generally includes output command signals for lower level processors and status data signals to be transmitted to higher level processors. If the processor is unable to complete an output function within one clock cycle, the processor continues processing until completion of the output function and writes out the data during the write portion of the next clock cycle.

Figure 19:
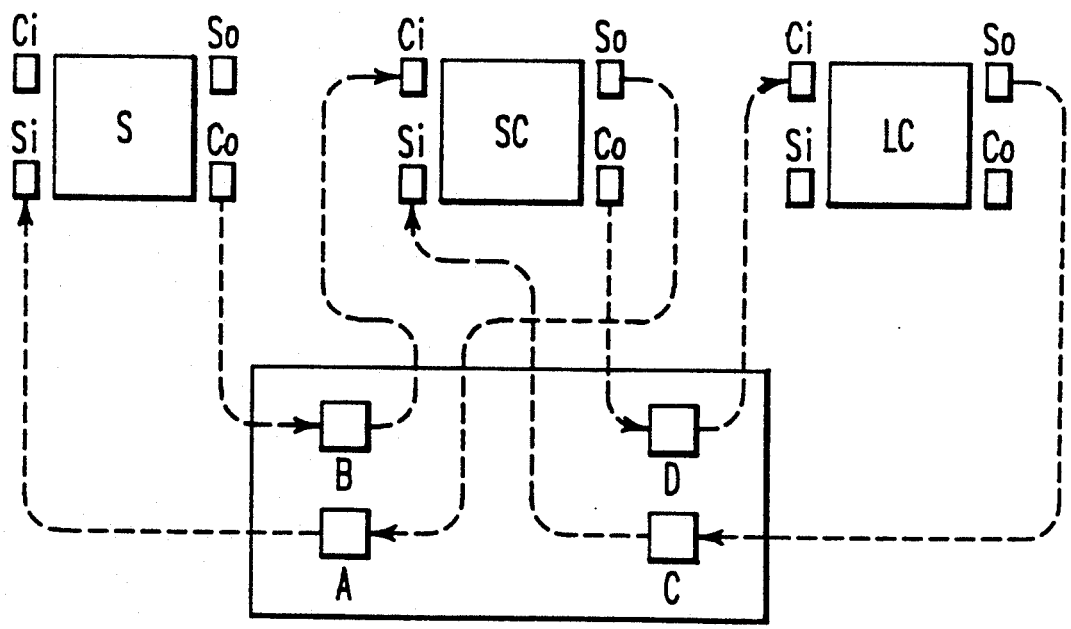
FIG. 19 illustrates the signal flow between several control system processors.

FIG. 19 illustrates the flow of command and status signals between the processors of first, second and third control levels and the common memory buffer 226. As an example, the processors represent the supervisor controller (S), a system controller (SC) and a loop controller (LC), respectively. The processors, however, are also representative of the signal flow between the system controller, a buffer station controller and an interface shelf controller. The supervisory computer receives an input command signal from an operator interface 228 (FIG. 16). The supervisory computer retrieves status data relating, for example, to a lower level buffer station processor from a common buffer "A" where the data was written by the system processor during a previous clock cycle. The supervisory computer processes the input command to obtain several subtask commands. The subtask commands are written to a common buffer "B" and subsequently transmitted to the system controller. The system controller, in turn, reads status data from a common buffer "C" that was written to by a lower level processor (e.g., a buffer station controller) during a previous clock cycle. The system controller uses the status data to process the supervisory computer command into subtasks that are assigned to the buffer station controller, such as transferring all articles of a particular type to an interface shelf for pick-up.

With further reference to FIG. 19, all of the buffers in the common memory buffer are identified with a number which indicates the cycle during which the data stored therein was written. Each processor, therefore, can determine how current its input data is by comparing this number with a current cycle number that is continuously updated.

B. Operation of Hardware Components

The tasks which have been defined for each of the processors in the system depicted in FIG. 16 will now be described. A flow chart is provided below to generally describe the manner in which exemplary operator commands are executed in a process involving several different control level processors. The operator commands shall be described in a scenario involving the sorting and movement of addressed letters between United States Postal Service equipment in a mail handling facility. It is to be understood, however, that the monorail pathways, carriers and buffer racks and their associated control processors can be used in a variety of applications such as warehouse operations, inventory control and the like.

The function of the supervisory computer is primarily to receive requests from the operator via the operator interface 228. Operator commands generally relate to requests for transferring trays of letters which have been sorted by a particular zip code. As will be discussed in further detail below in connection with the operator shelves of the buffer stations, each tray is provided with an identification number which corresponds to the zip code of the letter stored therein. The identification numbers of the trays have been stored previously in the common memory buffer 226 by a buffer station controller 26. The supervisory computer 40 accesses the common memory buffer 226 to obtain status information on each of the buffer stations 24 distributed throughout each of the loops 20 within the system (FIG. 1). The status information comprises addresses which correspond to shelf locations within the buffer stations on which the trays containing letters with a selected zip code are stored.

Based on the status information obtained from the common memory buffer, the supervisory computer 40 (FIG. 16) generates primary order lists. The order lists comprise commands that instruct the system controllers 36 to transfer or store articles such as letter trays. The system controllers 36 further divide the primary order lists to secondary order lists for individual buffer stations. These secondary order lists comprise commands that instruct the buffer stations 24 to execute the transfer of letter trays stored therein to a selected buffer shelf 54 (FIG. 2), to an operator shelf 52, or to an interface shelf 50 in order to be picked up by a carrier. The system controllers also send transfer commands to the loop controllers 25. The buffer station controllers 26 and the loop controller 25 associated with a particular loop are operable independently of each other. The system controller coordinates the transfer of letter trays between buffer stations and the movement of the carriers therebetween on a single loop. The supervisory computer coordinates multiple loop systems, wherein each system comprises a loop controller and a buffer station controller for each buffer station associated therewith. The supervisory computer is further operable to update a graphics display of the selected letter trays within the system upon complete execution of a letter tray transfer by the buffer stations.

Each buffer station controller within the system is operable to coordinate the functioning of the following asynchronous systems: (1) the operator area system, (2) the elevator transport system, and (3) the carrier interface system. The buffer station controller decomposes commands received from the system controller and defines a series of commands that are sent to the three asynchronous systems to effect the next tray transfer within the buffer station. For example, the buffer station controller reviews the order list of zip codes received from the system controller and the location of letter trays of selected zip codes and subsequently commands one or more of the three systems to direct the letter tray to a different buffer shelf, to the operator shelf or to an interface shelf for pick up by a carrier. The buffer station controller is further operable to communicate with the carriers via the system controller in order to send a tray to the carrier or to receive a tray from the carrier. The buffer station controller updates a tray data location file in the common memory buffer whenever a tray is transferred into or out of the buffer station by a carrier. The buffer station controller also transmits to the common memory buffer status information relating to the number of vacant shelves within the buffer, the processing status of a command received from the system computer, and information pertaining to letter trays that are to be picked up by a carrier.

The elevator and elevator shelf controller decomposes commands received from the buffer station controller into sequences of commands which instruct the lift to move up or down to a selected shelf location and which instruct the elevator shelves to pick up a letter tray from or deliver it to a selected shelf location. The elevator and elevator shelf controller is operable to update the tray data location file in the common memory buffer upon completion of a transfer command from the buffer station controller.

The operator shelves of a buffer station are coupled to a processor and a variety of input devices. The input devices include sensors for detecting the presence of a letter tray that is being introduced into the system as well as the actual movement of the tray. The input devices also include means for automatically detecting an identification number associated with a letter tray to be introduced into the system, such as bar code readers and transceivers for communicating with radio frequency tags attached to the letter trays. The operator area controller provides the buffer station controller with status information relating to the presence of trays on the operator shelf as well as new tray identification numbers to be introduced into the tray data location file of the common memory buffer.

The loop controller decomposes commands received from the system computer into a sequence of transfer commands for instructing carriers along the loop to move to desired locations in order to pick up or deliver trays. The transfer commands are transmitted to selected carriers using radio frequency communication. Based on radio frequency signals received from each of the carriers on a loop, the loop controller determines the present location and status of each of the carriers as well as the optimum carrier to which the next transfer command is assigned. Upon receiving signals from the carriers acknowledging the complete execution of a transfer command, the loop controller transmits to the system computer status information relating to the completion of a requested task as well as to carrier availability.

The processor on board each of the carriers controls the movement of the carrier along the monorail pathway in accordance with transfer commands received from the loop controller. The carrier processor also controls the alignment of the carrier with the interface shelves of a selected buffer station as well as the transfer of a tray onto or off of the carrier shelf.

Figure 20A:
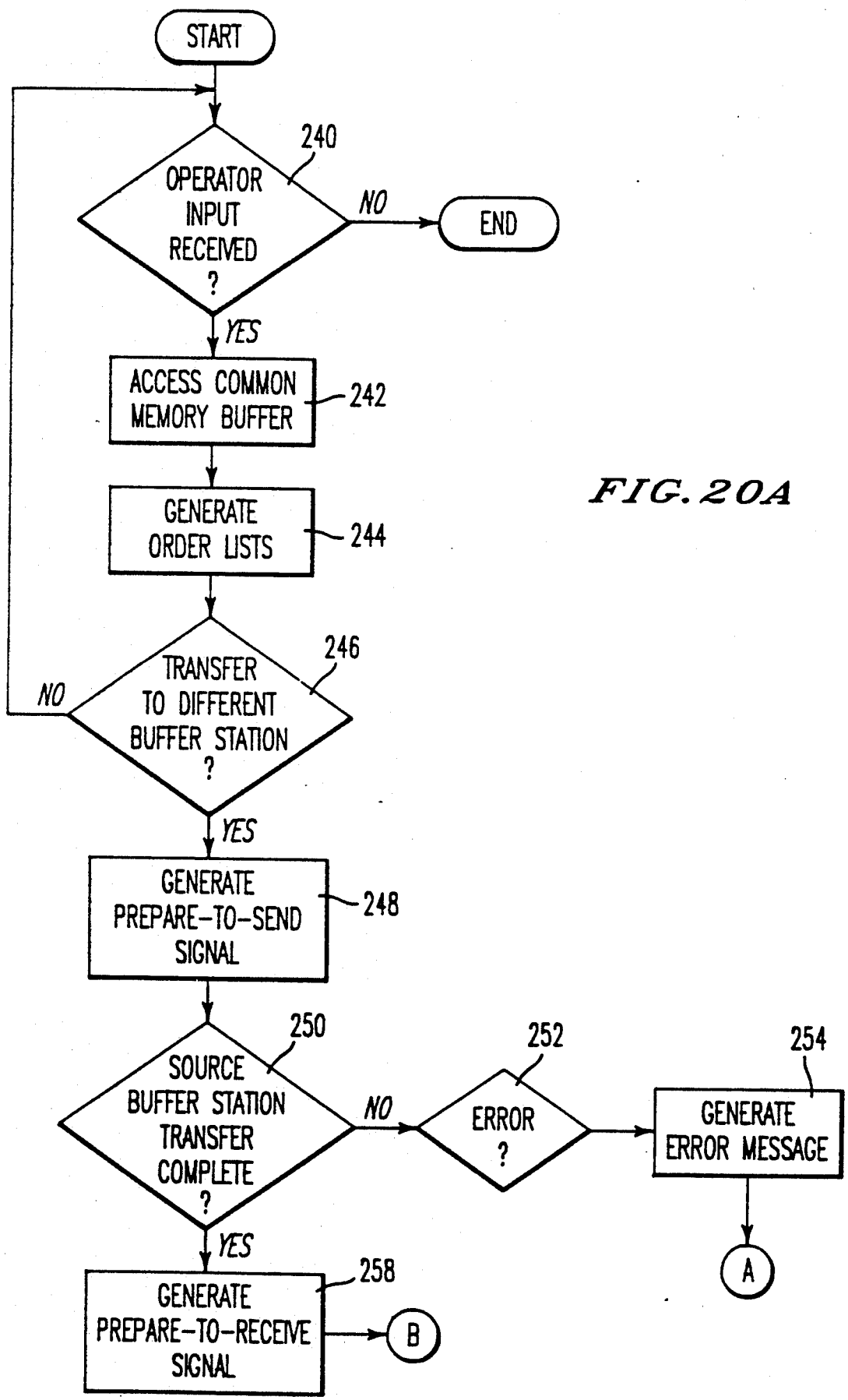
FIGS. 20a and 20b are a flow chart depicting an illustrative sequence of operations performed by a control system processor.
Figure 20B:
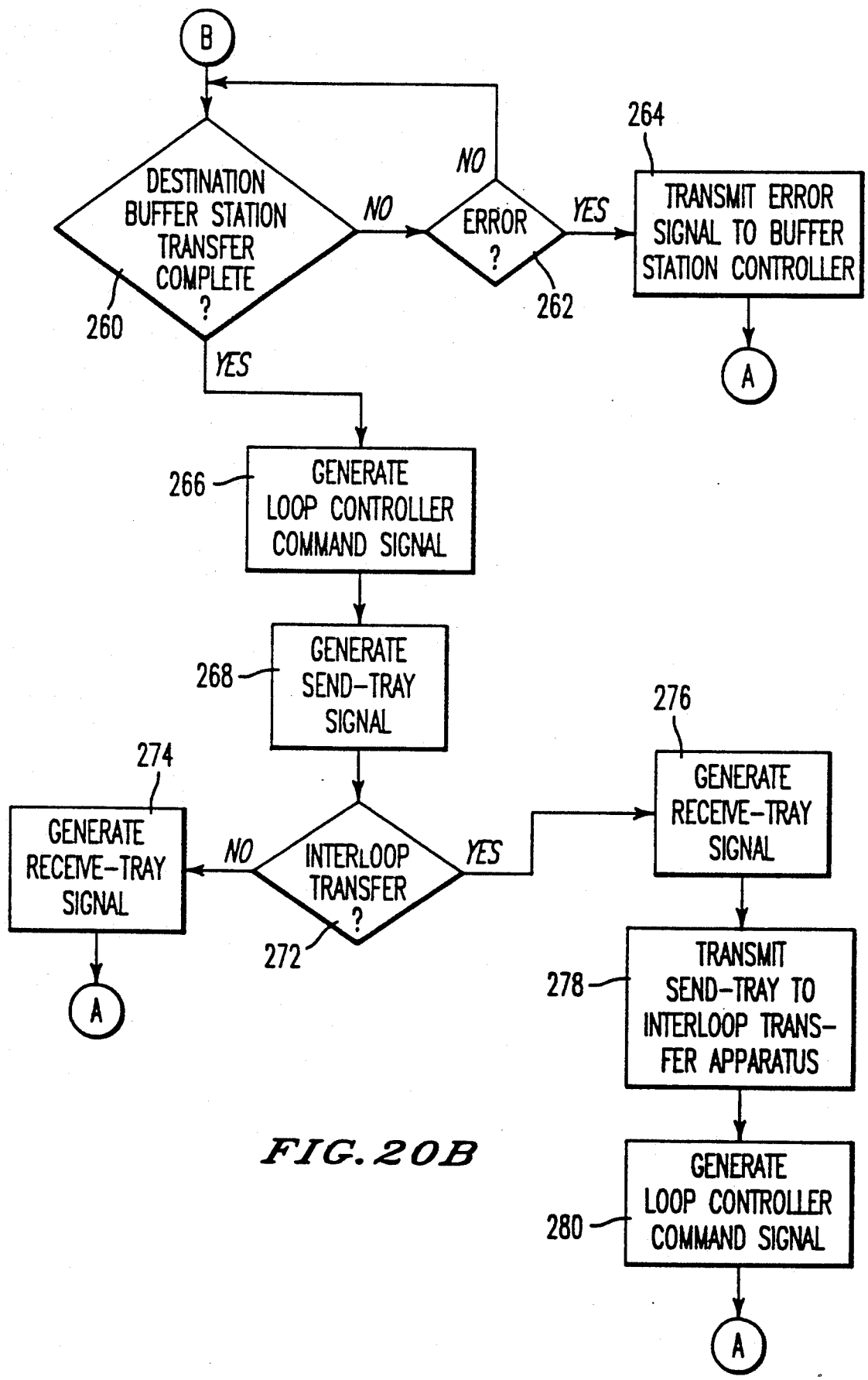

FIG. 20 is a flow chart illustrating at least one of several possible sequences of operations that are performed to execute an operator command. The sequences of operation shall be explained using the following scenario: an operator request is executed to transfer a letter tray containing letters addressed to the same zip code from the buffer station of a first loop to an interloop transfer device between the first loop and the second loop.

FIG. 20 is a flow chart which illustrates the sequence of operations carried out by the supervisory computer. The sequence begins when a command is received from an operator via the operator interface 228 (FIG. 16). The operator commands are generally requests for a plurality of articles identified by a particular identification number, e.g., trays of letters having the same zip code, to be transferred to a selected destination such as a selected loading area on a plant floor. As indicated in block 242, the supervisory computer accesses a tray data location file in the common memory buffer to ascertain which of the plurality of buffer stations is presently storing trays of letters having the selected zip code. In block 244, the computer creates order lists and transmits them to the system controllers, which subdivide the lists and transmit them to appropriate buffer station controllers in order to instruct the buffer station controllers as to which processes the stations will need to perform in order to fulfill the operator's request. The processes performed by the buffer stations are described below.

With reference to decision block 246, the supervisory computer can accept any number of additional operator commands as in block 240. The supervisory computer coordinates the operation of the system controllers and the interloop transfer controllers 30 (FIG. 16) to coordinate movement of trays between systems as well as assign order lists. In block 248, the system controller coordinates buffer stations carrier transfers to move trays between buffer stations. The system controller proceeds to generate a prepare-to-send signal and transmits the signal to a buffer station, which shall be designated as the source buffer station because the station operates to transfer a tray of letters stored therein to another buffer station. The source buffer station proceeds to perform the transfer of the tray between the shelves in order to place the tray on an interface shelf. When the source buffer station has completed transporting a selected tray to the an interface shelf thereof, the source buffer station provides the system controller with a feedback signal indicating the completion of the transfer. As indicated by decision block 250, the system controller does not proceed to initialize a buffer station to receive the tray until the feedback signal from the source buffer station acknowledging task completion is received. If the feedback signal is not received within a predetermined amount of time, the system computer generates an error signal as indicated in blocks 252 and 254. The supervisory computer can use the error signal from the system computer to indicate that a faulty condition has occurred on the display 230 (FIG. 16).

The system computer initializes a destination buffer station by generating and transmitting thereto a prepare-to-receive signal, as shown in block 258. The destination buffer station performs tray transfers which are required to clear an interface shelf for receiving a tray from the source buffer station via a carrier.

With reference to decision blocks 260 and 262, the system controller allows a predetermined amount of time to elapse before receiving an acknowledgement signal from the destination buffer station indicating that the interface shelf thereof is ready for an article transfer. If the acknowledgement signal is not received within that period of time, the system computer sends an error message to the display as indicated by block 264. Once the destination station has completed the task of preparing an interface shelf, the system computer sends a command to the loop controller of the loop in which the source buffer station is located which instructs the loop controller to transport a carrier from the source buffer station to the destination buffer station. The loop controller proceeds to move the carrier to the source buffer station. The system computer, simultaneous with sending this transport command to the loop controller, sends a send-tray command to the source buffer station as indicated by block 268. The source buffer station, through communication with the carrier, proceeds to send command signals to the interface shelf thereof instructing the interface shelf to extend toward the carrier once the carrier has arrived, and to interlock with the carrier. Further, the source buffer station transmits to the system controller a signal indicating that the transfer between the interface shelf and the carrier is complete.

As indicated by decision block 272, if the destination buffer station is not an interloop transfer apparatus, the system computer generates a receive-tray command signal and transmits the signal to the destination buffer station controller, as indicated by block 274. In response to receiving a receive-tray command signal, the buffer station controller generates command signals for extending the interface shelf and interlocking the shelf with the carrier once the carrier has arrived, to effect the transfer of an article from the carrier to the interface shelf. The buffer station controller is also operable to transmit the system computer an acknowledgement signal indicating that the carrier to interface shelf transfer is complete.

If the decision block 272 is in the affirmative, the system controller effects the transport of trays by sending the appropriate command signals to the respective loop controller. Following the transfer of an article from the interface shelf of the source buffer station to the carrier, the carrier is transported under the control of the loop controller of the source buffer station loop to a destination buffer station which is adjacent to an interloop transfer device. As indicated in block 276, a supervisory computer generates a receive tray command which is transmitted to the interloop transfer controller. Following the transfer of the article from the carrier to the interface shelf of the interloop transfer apparatus, the supervisory computer receives an acknowledgement signal from the transfer apparatus controller indicating the completion of the article transfer. In block 278, the supervisory computer generates a send-tray command signal and transmits the signal to the interloop transfer apparatus controller. The interloop transfer controller then proceeds to transfer the article from the interface shelf corresponding to the source buffer station loop to the interface shelf corresponding to the adjacent loop. In block 280, the supervisory computer generates and transmits a command signal to the system controller of the adjacent loop to effect the transport of a carrier to the interface transfer apparatus. The controller of the transfer apparatus provides command signals for extending the interface shelf and interlocking the shelf with the carrier on the adjacent loop. Upon completion of the article transfer, the system controller of the adjacent loop transports the carrier to another destination buffer station located along the adjacent loop. The supervisory computer then proceeds to receive another operator command.

Although the present invention has been described with reference to a preferred embodiment, the invention is not limited to the details thereof. Various modifications and substitutions will occur to those of ordinary skill in the art, and all such modifications and substitutions are intended to fall within the spirit and scope of the invention as defined in the appended claims.

What is claimed is:

1. An article handling system comprising:
    a closed loop pathway comprising a monorail;
    a movable article carrier which travels on said monorail along said pathway, said movable article carrier comprising drive means therefor;
    at least one article buffer station located adjacent to said pathway, comprising
        vertically spaced shelves on which articles are stored,
        a vertically movable elevator having elevator drive means for transporting at least one of said articles to and from selected ones of said shelves, and
        a transfer device having transfer device drive means provided on at least one of said shelves for transferring said articles between said buffer station and said movable article carrier; and
    control means for controlling said elevator, the transfer of at least one of said articles between said article storage buffer station and said movable article carrie by said transfer device, and the movement of said movable article carrier along said pathway,
    whereby said article are transferrable from said movable article carrier to said one of said shelves having said transfer device, and from there transferrable to said elevator for subsequent transfer to said selected ones of said shelves.

2. An article handling system as claimed in claim 1, wherein said movable carrier is provided with a generally planar surface for accommodating at least one of said articles thereon and a pivotable retaining member coupled to said movable carrier, said pivotable retaining member being selectively configurable between an extended position for retaining said article on said surface, and a retracted position for permitting said article to be displaced to and from said movable carrier.

3. An article handling system as claimed in claim 1, wherein said elevator comprises at least one generally planar surface for accommodating at least one of said articles thereon and an elevator transfer device provided on said elevator for transferring said article between said surface and at least one of said shelves.

4. An article handling system as claimed in claim 3, wherein said elevator transfer device comprises a member which can be selectively displaced between extended and retracted positions to effect the movement of said article between said elevator and at least one of said shelves.

5. An article handling system as claimed in claim 1, wherein said transfer device comprises a member which can be selectively displaced between extended and retracted positions to effect the movement of at least one of said articles between said at least one of said shelves and said movable carrier.

6. An article handling system as claimed in claim 1, wherein said control means comprises a memory device for storing data relating to each of said articles, said movable carrier, and each of said shelves, said control means being operable to determine from said stored data the location of said articles with respect to said carrier, said buffer station and said pathway to substantially continuously monitor the location of each of said articles within said article handling system.

7. An article handling system as claimed in claim 1, wherein said control means comprises a loop controller coupled to said movable carrier for generating a carrier control signal to control the movement of said movable carrier along said pathway and a memory device, said loop controller comprising a first transceiver for transmitting said carrier control signal to said movable carrier.

8. An article handling system as claimed in claim 7, wherein said movable carrier comprises a second transceiver for receiving said carrier control signal, and a carrier controller for controlling the operation of said movable carrier in accordance with said carrier control signal, generating a carrier status signal, and transmitting said carrier status signal to said loop controller using said second transceiver.

9. An article handling system as claimed in claim 8, wherein said first transceiver and said second transceiver are operable to substantially continuously transmit and receive said carrier control signal and said carrier status signal, said loop controller being operable to determine the position of said movable carrier along said pathway using said carrier status signal and to store said position data in said memory device.

10. An article handling system as claimed in claim 1, further comprising:
    a second closed loop pathway comprising a second monorail;
    a second movable article carrier which travels on said second monorail along said second pathway, said second movable article carrier comprising drive means therefor;
    a second article storage buffer station located adjacent to said second pathway, comprising
        vertically spaced shelves on which articles are stored,
        a vertically movable elevator having elevator drive means for transporting at least one of said articles to and from selected ones of said shelves, and
        a transfer device having transfer device drive means provided on at least one of said shelves for transferring said articles between said second buffer station and said second movable article carrier; and
    an interloop transfer device having interloop transfer device drive means located between said first and said second pathways for transferring said articles between said movable article carrier and said second movable article carrier.

11. An article handling system as claimed in claim 10, further comprising first and second buffer station controllers for controlling said elevators and said transfer devices corresponding to said buffer station and said second buffer station, respectively.

12. An article handling system as claimed in claim 10, wherein said buffer station and said second buffer station comprise an article receiving device for receiving articles originating from an article source that is external to said article handling system, said articles having corresponding identification codes and said articles receiving device comprising a sensor for sensing said identification codes.

13. An article handling system as claimed in claim 12, wherein said control means comprises a memory device for storing said identification codes, and first and second buffer station controllers for controlling corresponding said article receiving devices, said elevators and said transfer devices.

14. An article handling system as claimed in claim 10, wherein said control means comprises:
   first and second loop controllers for controlling the movement of said movable carrier and said second movable carrier along said pathway and said second pathway, respectively;
   first and second buffer station controllers coupled to said buffer station and said second buffer station, respectively, for controlling corresponding said elevators and said transfer devices;
   a first system controller for controlling said first loop controller and said first buffer station controller;
   a second system controller for controlling said second loop controller and said second buffer station controller;
   an interloop transfer controller for controlling said interloop transfer device; and
   a memory device coupled to said first and second system controllers and said interloop transfer device for storing data generated by said first and second loop controllers which relates to the positions of said movable carrier and said second movable carrier along said pathway and said second pathway, respectively, and for storing data generated by said first and second buffer station controllers and said interloop transfer controller which relates to the location of said articles therein.

15. An article handling system as claimed in claim 14, wherein said control means further comprises a supervisory processor coupled to said memory device and said first and second system controllers to control said first and second system controllers in accordance with said carrier position data and said article location data stored in said memory device.

16. An article handling system as claimed in claim 15, further comprising an operator interface device coupled to said supervisory processor for providing said supervisory processor with operator command signals for selectively controlling the operation of said first and second system controllers, said operator command signals being operable to specify at least one of a plurality of destination locations along said pathway and said second pathway and in said buffer station, said second buffer station and said interloop transfer device.

* * * * *